(12) United States Patent
Bhamri et al.

(10) Patent No.: US 12,349,174 B2
(45) Date of Patent: Jul. 1, 2025

(54) FLEXIBLE REPETITION OF PUSCH MINI-SLOTS WITHIN A SLOT

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/600,187

(22) Filed: Mar. 8, 2024

(65) Prior Publication Data

US 2024/0215059 A1    Jun. 27, 2024

Related U.S. Application Data

(63) Continuation of application No. 17/128,348, filed on Dec. 21, 2020, now Pat. No. 11,974,303, which is a
(Continued)

(30) Foreign Application Priority Data

Aug. 9, 2018 (EP) .................................. 18188330

(51) Int. Cl.
*H04W 72/53* (2023.01)
*H04L 5/00* (2006.01)
(Continued)

(52) U.S. Cl.
CPC ........... *H04W 72/53* (2023.01); *H04L 5/0048* (2013.01); *H04L 5/0082* (2013.01); *H04W 72/0446* (2013.01); *H04W 72/23* (2023.01)

(58) Field of Classification Search
CPC ..... H04W 72/23; H04L 5/0048; H04L 5/0082
See application file for complete search history.

(56) References Cited

U.S. PATENT DOCUMENTS 7,187,708 B1    3/2007  Shiu et al.
8,873,362 B2   10/2014  Papasakellariou et al.
(Continued)

FOREIGN PATENT DOCUMENTS

CN          1478329 A    2/2004
CN        101977385 A    2/2011
(Continued)

OTHER PUBLICATIONS

Chinese Office Action, issued Dec. 14, 2023, for Chinese Patent Application No. 1 201980043593.0. (23 pages) (with English translation).
(Continued)

*Primary Examiner* — Kenny S Lin
(74) *Attorney, Agent, or Firm* — Seed IP Law Group LLP

(57) ABSTRACT

The disclosure relates to a transmission device for transmitting data to a reception device in a communication system. The transmission device comprises circuitry which, in operation, allocates the data to a plurality of transmission time intervals, TTIs, respectively comprising a lower number of symbols than a slot and the plurality of TTIs including an initial TTI and one or more subsequent TTIs subsequent to the initial TTI, wherein the data allocated to each of the plurality of TTIs is the same, further allocates a demodulation reference signal, DMRS, to the initial TTI, and obtains a DMRS allocation for each of the subsequent TTIs indicating whether or not no DMRS is allocated to the respective TTI to be transmitted in addition to the data. The transmission device further comprises a transceiver which, in opera-
(Continued)

tion, transmits, within the slot, the data and DMRS in accordance with the DMRS allocation.

12 Claims, 17 Drawing Sheets

Related U.S. Application Data continuation of application No. PCT/EP2019/063928, filed on May 29, 2019.

(51) Int. Cl.
*H04W 72/0446* (2023.01)
*H04W 72/23* (2023.01)

(56) References Cited

U.S. PATENT DOCUMENTS

| | | | |
|---|---|---|---|
| 9,179,453 | B2 | 11/2015 | Papasakellariou et al. |
| 9,763,251 | B2 | 9/2017 | Papasakellariou et al. |
| 11,700,613 | B2 * | 7/2023 | Takeda ........... H04L 1/1607 370/329 |
| 2016/0353436 | A1 | 12/2016 | Au et al. |
| 2017/0171842 | A1 | 6/2017 | You et al. |
| 2017/0289992 | A1 | 10/2017 | Sun et al. |
| 2017/0332369 | A1 | 11/2017 | Hosseini et al. |
| 2018/0091267 | A1 | 3/2018 | Kim et al. |
| 2018/0131490 | A1 | 5/2018 | Patel et al. |
| 2018/0131498 | A1 | 5/2018 | Chen et al. |
| 2018/0279327 | A1 * | 9/2018 | Ying ............ H04W 72/0446 |
| 2018/0279344 | A1 | 9/2018 | Bagheri et al. |
| 2019/0229964 | A1 * | 7/2019 | Ouchi ............ H04L 5/0051 |
| 2020/0037346 | A1 | 1/2020 | Takeda et al. |
| 2020/0366426 | A1 * | 11/2020 | Han ............ H04W 72/1273 |
| 2021/0259005 | A1 | 8/2021 | Yoshioka et al. |
| 2022/0132533 | A1 * | 4/2022 | Taherzadeh Boroujeni ......... H04B 7/2656 |
| 2023/0140036 | A1 * | 5/2023 | Elshafie ........... H04W 72/1268 370/329 |

FOREIGN PATENT DOCUMENTS

| | | |
|---|---|---|
| CN | 102754373 A | 10/2012 |
| CN | 103428775 A | 12/2013 |
| CN | 104796230 A | 7/2015 |
| CN | 107637000 A | 1/2018 |
| CN | 107667565 A | 2/2018 |
| CN | 107820318 A | 3/2018 |
| CN | 108352877 A | 7/2018 |
| CN | 108353397 A | 7/2018 |
| EP | 3832923 A1 * 6/2021 ........... H04B 7/0404 |
| WO | WO 2018025949 A1 | 2/2018 |
| WO | WO 2018103002 A1 | 6/2018 |

OTHER PUBLICATIONS

Chinese Notice of Allowance, dated May 13, 2024, for Chinese Patent Application No. 201980043593.0. (8 pages) (with Partial English Translation).
Jiao et al., "Progress in Standardization of Direct Communications of Terminal," Modern Science & Technology of Telecommunications, Apr. 2015, 6 pages. (with English Abstract).
3GPP TR 38.801 V14.0.0, "3$^{rd}$ Generation Partnership Project; Technical Specification Group Radio Access Network; Study on new radio access technology; Radio access architecture and interfaces (Release 14)," Mar. 2017, 91 pages.
3GPP TR 38.804 V14.0.0, "3$^{rd}$ Generation Partnership Project; Technical Specification Group Radio Access Network; Study on New Radio Access Technology; Radio Interface Protocol Aspects (Release 14)," Mar. 2017, 57 pages.
3GPP TR 38.913 V14.3.0, "3$^{rd}$ Generation Partnership Project; Technical Specification Group Radio Access Network; Study on Scenarios and Requirements for Next Generation Access Technologies; (Release 14)," Jun. 2017, 39 pages.
3GPP TR 38.913 V15.0.0, "3$^{rd}$ Generation Partnership Project; Technical Specification Group Radio Access Network; Study on Scenarios and Requirements for Next Generation Access Technologies; (Release 15)," Jun. 2018, 39 pages.
3GPP TS 22.261 V16.4.0, "3$^{rd}$ Generation Partnership Project; Technical Specification Group Services and System Aspects; Service requirements for the 5G system; Stage 1 (Release 16)," Jun. 2018, 55 pages.
3GPP TS 38.211 V15.0.0, "3$^{rd}$ Generation Partnership Project; Technical Specification Group Radio Access Network; NR; Physical channels and modulation (Release 15)," Dec. 2017, 73 pages.
3GPP TS 38.211 V15.2.0, "3$^{rd}$ Generation Partnership Project; Technical Specification Group Radio Access Network; NR; Physical channels and modulation (Release 15)," Jun. 2018, 96 pages.
3GPP TS 38.212 V15.2.0, "3$^{rd}$ Generation Partnership Project; Technical Specification Group Radio Access Network; NR; Multiplexing and channel coding (Release 15)," Jun. 2018, 98 pages.
3GPP TS 38.213 V15.2.0, "3$^{rd}$ Generation Partnership Project; Technical Specification Group Radio Access Network; NR; Physical layer procedures for control (Release 15)," Jun. 2018, 99 pages.
3GPP TS 38.214 V15.2.0, "3$^{rd}$ Generation Partnership Project; Technical Specification Group Radio Access Network; NR; Physical layer procedures for data (Release 15)," Jun. 2018, 94 pages.
3GPP TS 38.300 V15.0.0, "3$^{rd}$ Generation Partnership Project; Technical Specification Group Radio Access Network; NR; NR and NG-RAN Overall Description; Stage 2 (Release 15)," Dec. 2017, 68 pages.
Chinese Office Action, dated Dec. 14, 2023, for Chinese Patent Application No. 201980043593.0. (23 pages) (with English Translation).
English Translation of Japanese Office Action, dispatched May 30, 2023, for Japanese Patent Application No. 2020-563757. (7 pages).
Ericsson, "NR High-Reliability URLLC scope for RAN1/RAN2," RP-172817, Agenda Item 9.2.1, 6 pages.
Huawei, HiSilicon, Nokia, Nokia Shanghai Bell, "New SID on Physical Layer Enhancements for NR URLLC," RP-181477, Agenda Item: 9.1.9, 3GPP TSG-RAN#80, La Jolla, US, Jun. 11-14, 2018, 5 pages.
International Search Report, mailed Jul. 19, 2019, for International Application No. PCT/EP2019/063928, 3 pages.
ITU-R, "IMT Vision—Framework and overall objectives of the future development of IMT for 2020 and beyond," Radiocommunication Sector of ITU, Recommendation ITU-R M.2083-0, M Series, Sep. 2015, 21 pages.
Motorola Mobility, "Using shortened DL TTI for reduced latency data transmission," R1-160971, Agenda Item: 7.3.4.2, 3GPP TSG RAN WG1#84, St. Julian's, Malta, Feb. 15-19, 2016. (3 pages).
NTT Docomo, Inc., "Revised WID on New Radio Access Technology," RP-172115, Agenda Item: 9.2.1, 3GPP TSG RAN Meeting #77, Sapporo, Japan, Sep. 11-14, 2017, 11 pages.
OPPO, "Remaining issues on grant-free," R1-1804013, Agenda Item: 7.1.3.3.4, 3GPP TSG RAN WG1 Meeting #92bis, Sanya, China, Apr. 16-20, 2018. (3 pages).
Qualcomm Incorporated, "UL Design for Shortened TTI," R1-1610008, Agenda item: 7.2.10.2.1, 3GPP TSG RAN WG1 #86b, Lisbon, Portugal, Oct. 10-14, 2016, 7 pages.

\* cited by examiner

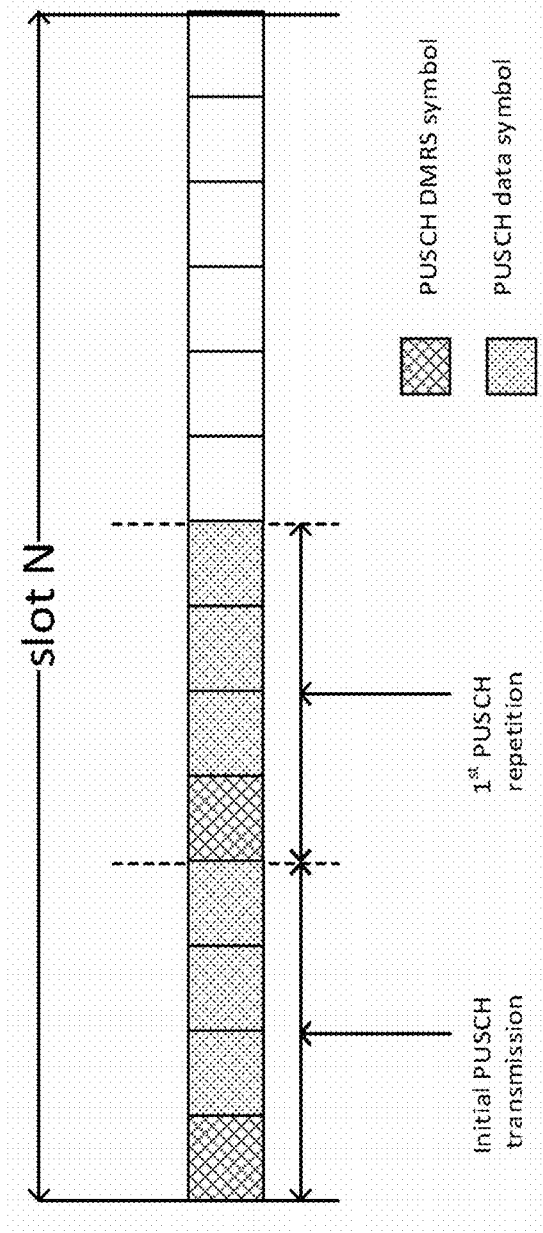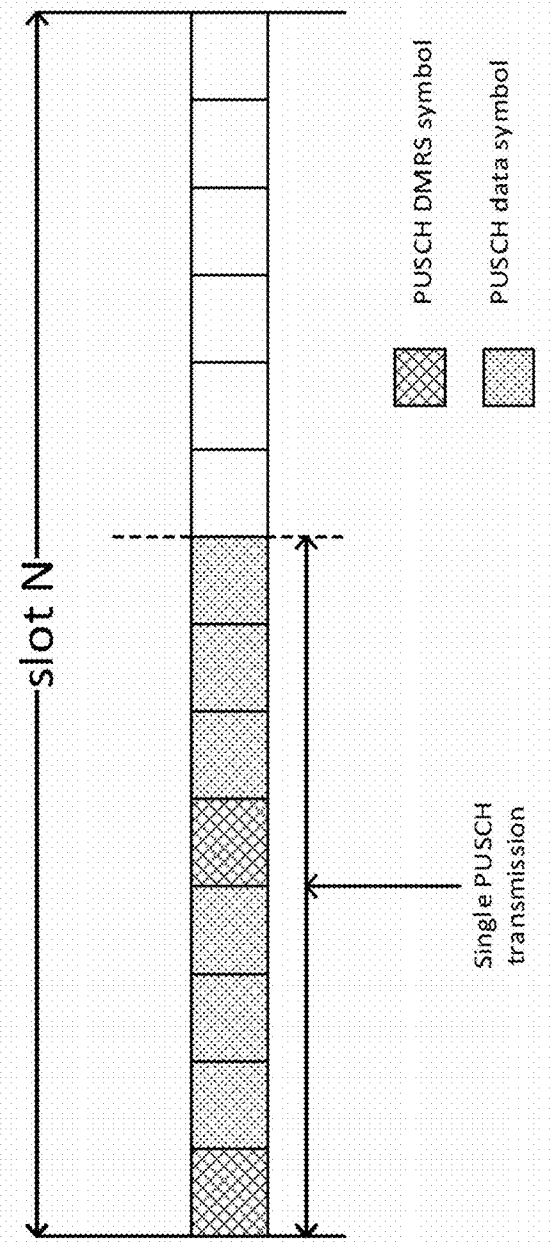

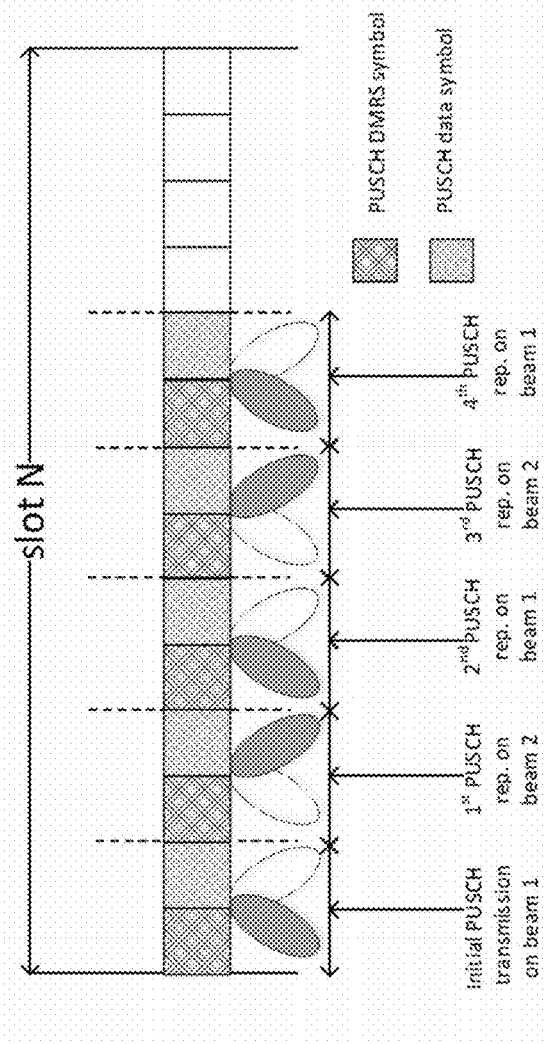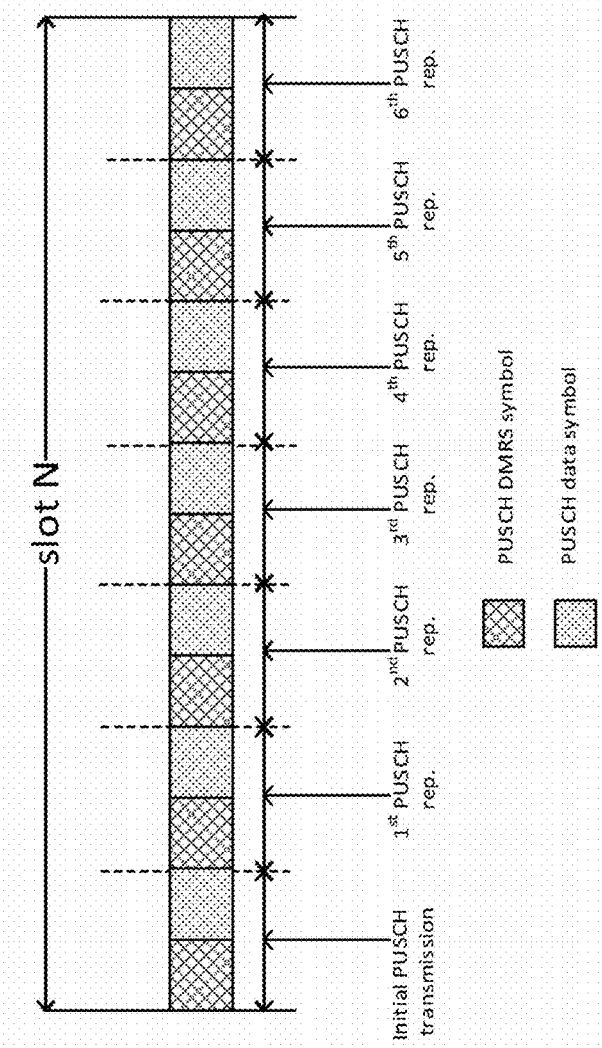

FLEXIBLE REPETITION OF PUSCH MINI-SLOTS WITHIN A SLOT

BACKGROUND

Technical Field

The present disclosure relates to transmission and reception, devices and methods in communication systems, such as 3GPP (3rd Generation Partnership Project) communication systems.

Description of Related Art

Recently, the 3rd Generation Partnership Project (3GPP) concluded the first release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and as a potential Release 15 work item that defines the first 5G standard. The aim of the study item is to develop a "New Radio (NR)" access technology, which operates in frequency ranges up to 100 GHz and supports a broad range of use cases, as defined during the RAN requirements study (see, e.g., 3GPP TR 38.913 "Study on Scenarios and Requirements for Next Generation Access Technologies," current version 14.3.0 available at www.3gpp.org).

The IMT-1010 (International Mobile Telecommunications-2020) specifications by the International Telecommunication Union broadly classified three major scenarios for next generation of mobile communications: enhanced Mobile Broadband (eMBB), massive Machine-type Communications (mMTC), and Ultra-Reliable and Low-Latency Communications (URLLC). In the recently completed 3GPP Release 15, the main focus was on standardizing the specifications for eMBB and some initial support for URLLC. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

In Release 15, the scope of URLCC with respect to reliability includes specification of new CQI (Channel Quality Indicator) and MCS (Modulation and Coding Scheme) table designs for target BLER of 1E-5, in addition to the already agreed tables for target BLER of 1E-1. For URLLC, for grant-based transmissions, one new RRC parameter is introduced for configuring a new RNTI (Radio Network Temporary Identifier). When the new RNTI is not configured, existing RRC parameter "mcs-table" is extended to select from 3 MCS tables (existing 64 QAM MCS table, existing 256 QAM MCS table, new 64 QAM MCS table). When mcs-table indicates the new 64 QAM MCS table then for DCI format 0_0/1_0 in CSS (common search space), existing 64 QAM MCS table is used, and for DCI formats 0_0/1_0/0_1/1_1 in USS (user search space), the new 64 QAM MCS table is used. Otherwise, existing behavior is followed. When the new RNTI (via RRC, Radio Resource Control) is configured, RNTI scrambling of DCI CRC is used to choose MCS table. If the DCI CRC is scrambled with the new RNTI, the new 64 QAM MCS table is used; otherwise, existing behavior is followed. The above configuration for DL (downlink) and UL (uplink) is separate.

The scope of reliability of URLLC in Release 15 was quite limited. Therefore, in RAN#80, a new study item on physical layer enhancements for NR URLLC was approved (see. RP-181477, "New SID on Physical Layer Enhancements for NR URLLC," Huawei, HiSilicon, Nokia, Nokia Shanghai Bell). In Release 15, the basic support for URLLC was introduced. For NR URLLC Rel. 16, further use cases with tighter requirements have been identified such as factory automation, transport industry and electrical power distribution.

BRIEF SUMMARY

One non-limiting and exemplary embodiment facilitates providing flexible demodulation reference signal configurations during repetition of data channels.

In one general aspect, the techniques disclosed here feature a transmission device for transmitting data to a reception device in a communication system. The transmission device comprises circuitry which, in operation, allocates the data to a plurality of transmission time intervals, TTIs, respectively comprising a lower number of symbols than a slot and the plurality of TTIs including an initial TTI and one or more subsequent TTIs subsequent to the initial TTI, wherein the data allocated to each of the plurality of TTIs is the same, further allocates a demodulation reference signal, DMRS, to the initial TTI, and obtains a DMRS allocation for each of the subsequent TTIs indicating whether or not no DMRS is allocated to the respective TTI to be transmitted in addition to the data. The transmission device further comprises a transceiver which, in operation, transmits, within the slot, the data and DMRS allocated to the initial TTI and the data allocated to the one or more subsequent TTIs to the reception device, wherein DMRS transmission in the one or more subsequent TTIs is performed in accordance with the DMRS allocation.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 5 is an example of repetition of 4-symbol PUSCH within the same slot;

FIG. 6 is a diagram of an example of 8-symbol PUSCH with one additional DMRS (demodulation reference signal);

FIG. 8 is a diagram showing repetition with beam hopping;

FIG. 10 is a diagram showing an example of two-symbol PUSCH transmission with 6 repetitions within a slot;

DETAILED DESCRIPTION

As presented in the background section, 3GPP is working at the next releases for the 5th generation cellular technology, simply called 5G, including the development of a new radio (NR) access technology operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figures 1, 2:
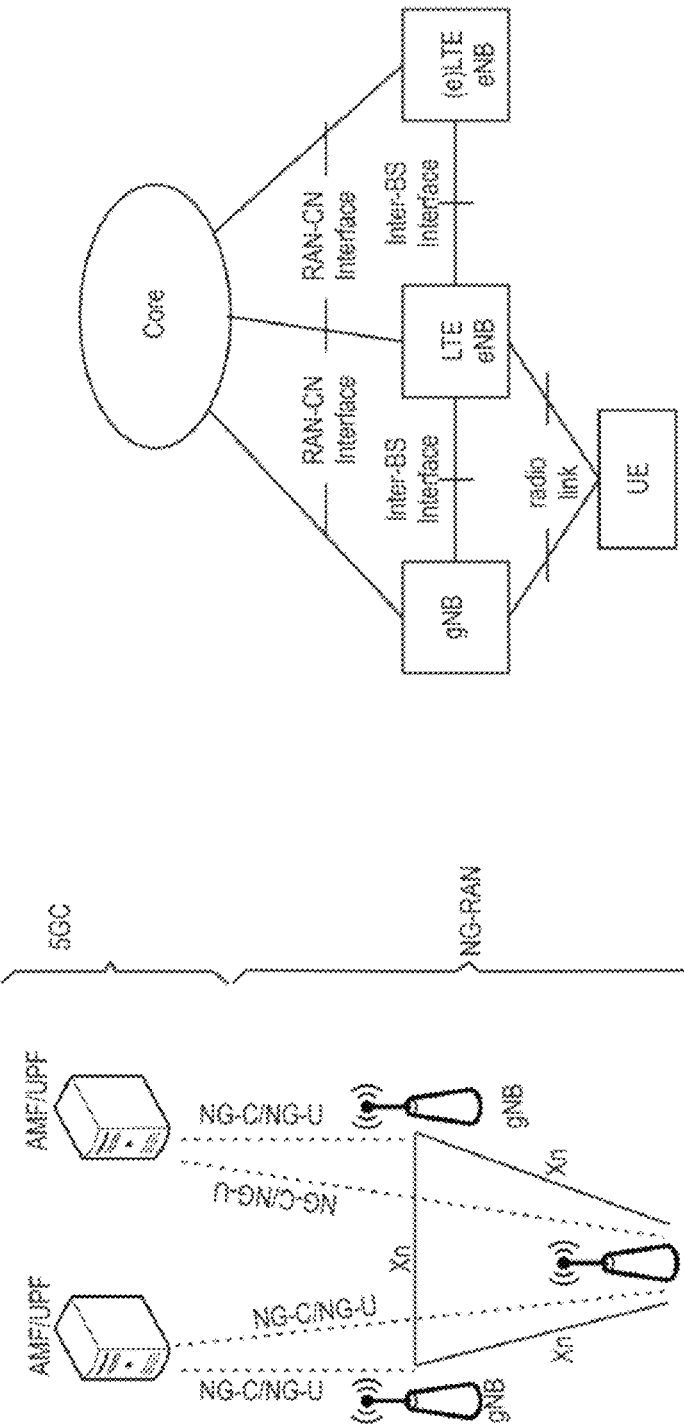
FIG. 1 is a schematic drawing of an exemplary architecture for a 3GPP NR system.
FIG. 2 is a block diagram of an exemplary user and control plane architecture for the LTE eNB, NR gNB, and UE.

Among other things, there has been a provisional agreement on the overall system architecture. The NG-RAN (Next Generation—Radio Access Network) consists of gNBs, providing the NG-radio access user plane, SDAP/PDCP/RLC/MAC/PHY (Service Data Adaptation Protocol/Packet Data Convergence Protocol/Radio Link Control/Medium Access Control/Physical) and control plane, RRC (Radio Resource Control) protocol terminations towards the UE. The NG-RAN architecture is illustrated in FIG. 1, based on TS 38.300 v.15.0.0, section 4 incorporated herein by reference. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface.

Various different deployment scenarios are currently being discussed for being supported, as reflected e.g., in 3GPP TR 38.801 v14.0.0, "Study on new radio access technology: Radio access architecture and interfaces." For instance, a non-centralized deployment scenario (section 5.2 of TR 38.801; a centralized deployment is illustrated in section 5.4 incorporated herein by reference) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB. As mentioned before, the new eNB for NR 5G may be exemplarily called gNB.

Figure 3:
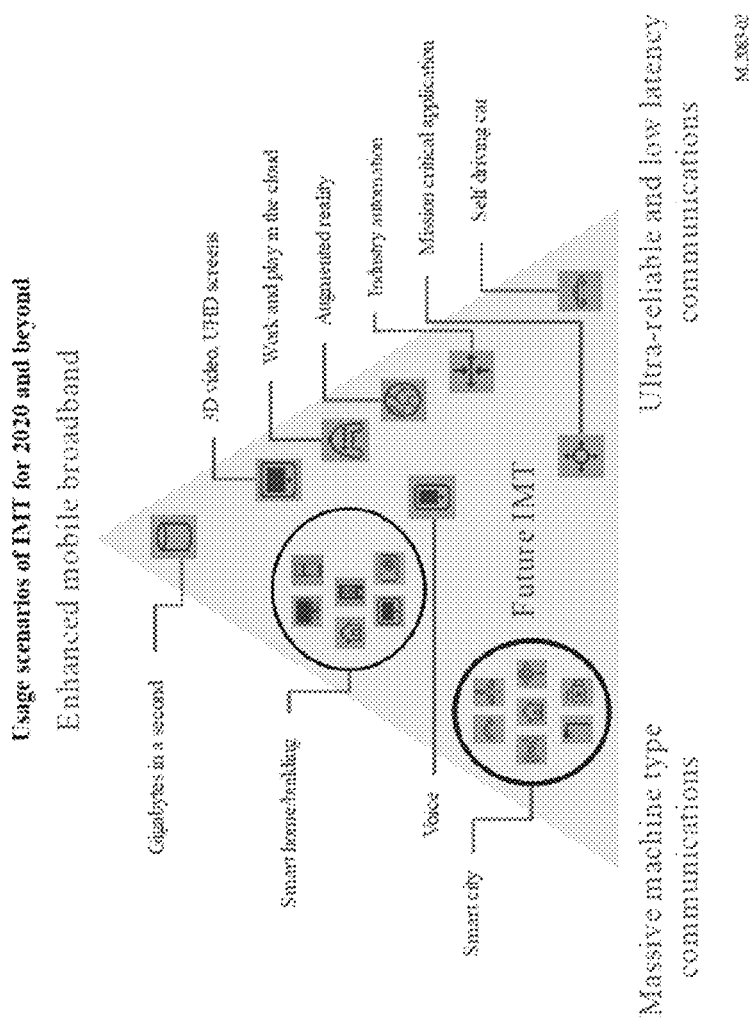
FIG. 3 is a schematic drawing showing usage scenarios of Massive Machine Type Communications (mMTC) and Ultra Reliable and Low Latency Communications (URLLC)

As also mentioned above, in 3rd generation partnership project new radio (3GPP NR), three use cases are being considered that have been envisaged to support wide variety of services and applications by IMT-2020 (see Recommendation ITU-R M.2083: IMT Vision—"Framework and overall objectives of the future development of IMT for 2020 and beyond," September 2015). The specification for the phase 1 of enhanced mobile-broadband (eMBB) has been concluded by 3GPP in December 2017. In addition to further extending the eMBB support, the current and future work would involve the standardization for ultra-reliable and low-latency communications (URLLC) and massive machine-type communications. FIG. 3 (from the Recommendation ITU-R M.2083) illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. In the current WID (work item description) RP-172115, it is agreed to support the ultra-reliability for URLLC by identifying the techniques to meet the requirements set by TR 38.913.

For NR URLCC in Release 15, key requirements include a target user plane latency of 0.5 ms for UL (uplink) and 0.5 ms for DL (downlink). The general URLLC requirement for one transmission of a packet is a BLER (block error rate) 1E-5 for a packet size of 32 bytes with a user plane of 1 ms. From RAN1 perspective, reliability can be improved in a number of possible ways. The current scope for improving the reliability is captured in RP-172817 that includes defining of separate CQI tables for URLLC, more compact DCI formats, repetition of PDCCH, etc. However, the scope may widen for achieving ultra-reliability as the NR becomes more stable and developed (for NR URLCC key requirements, see also 3GPP TR 38.913 V15.0.0, "Study on Scenarios and Requirements for Next Generation Access Technologies" incorporated herein by reference). Accordingly, NR URLLC in Rel. 15 should be capable of transmitting 32 bytes of data packet within a user-plane latency of 1 ms at the success probability corresponding to a BLER of 1E-5. Particular use cases of NR URLCC in Rel. 15 include Augmented Reality/Virtual Reality (AR/VR), e-health, e-safety, and mission-critical applications (see also ITU-R M.2083-0).

Moreover, technology enhancements targeted by NR URLCC in Release 15 aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5 (for the technology enhancements, see also 3GPP TS 38.211 "NR; Physical channels and modulation," TS 38.212 "NR; Multiplexing and channel coding," TS 38.213 "NR; Physical layer procedures for control," and TS 38.214 "NR; Physical layer procedures for data," respective versions V15.2.0, all incorporated herein by reference).

The use case of mMTC is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases and especially necessary for URLLC and mMTC is high reliability or ultra-reliability. Several mechanisms can be considered to improve the reliability from radio perspective and network perspective. In general, there are few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC Rel. 16, further use cases with tighter requirements have been identified such as factory automation, transport industry and electrical power distribution, including factory automation, transport industry, and electrical power distribution (see RP-181477, "New SID on Physical Layer Enhancements for NR URLLC," Huawei, HiSilicon, Nokia, Nokia Shanghai Bell, incorporated herein by reference). The tighter requirements are higher reliability (up to 10-6 level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases (see also 3GPP TS 22.261 "Service requirements for next generation new services and markets" V16.4.0, incorporated herein by reference and RP-181477).

Moreover, for NR URLCC in Rel. 16, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In general, TTI determines the timing granularity for scheduling assignment. One TTI is the time interval in which given signals is mapped to the physical layer. Conventionally, the TTI length can vary from 14-symbols (slot-based scheduling) to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.0.0 (2017-12) incorporated herein by reference). However, assignment of time resources for transmission may also be non-slot based. In particular, the TTIs in non slot-based assignment may correspond to mini-slots rather than slots. I.e., one or more mini-slots may be assign to a requested transmission of data/control signaling. In non slot-based assignment, the minimum length of a TTI may conventionally be 2 OFDM symbols.

Other identified enhancements are related to scheduling/HARQ/CSI processing timeline and to UL inter-UE Tx prioritization/multiplexing. Further identified are UL configured grant (grant free) transmissions, with focus on improved configured grant operation, example methods such as explicit HARQ-ACK, ensuring K repetitions and mini-slot repetitions within a slot, and other MIMO (Multiple Input, Multiple Output) related enhancements (see also 3GPP TS 22.261 V16.4.0).

The present disclosure is related to the potential layer 1 enhancements for further improved reliability/latency and for other requirements related to the use cases identified in (RP-181477, "New SID on Physical Layer Enhancements for NR URLLC," Huawei, HiSilicon, Nokia, Nokia Shanghai Bell). Specifically, enhancements for PUSCH (Physical Uplink Shared CHannel) repetition are discussed. The impact of the proposed ideas in this disclosure is expected to be on PUSCH repetition enhancements which is within the main scope of new SI (study items)/WI (work items) on NR URLLC in Rel. 16.

PUSCH Repetition

One of the scopes for potential enhancements is related to mini-slot repetition of PUSCH within slot. In the following, a motivation for supporting repetition of PUSCH within a slot which may allow for potential enhancements to the repetition mechanism for further improving the reliability and/or latency to satisfy the new requirements of NR URLLC, is provided.

To achieve the latency requirement for URLLC PUSCH transmission, one-shot transmission (i.e., single (TTI) assignment) is ideal, provided the reliability requirement is satisfied. However, it is not always the case that the target BLER of 1E-5 is achieved with one-shot transmission. Therefore, retransmission or repetition mechanisms are required. In NR Rel. 15, both retransmissions and repetitions are supported to achieve the target BLER, when one-shot transmission is not enough. HARQ-based retransmission is well known to improve the overall reliability, by using the feedback information and improving the subsequent retransmissions according to the channel conditions. However, they suffer from additional delay due to feedback processing timeline. Therefore, repetitions are useful for highly delay-tolerant services, as they do subsequent transmission of the same data packet without waiting for any feedback.

A PUSCH repetition can be defined as "transmitting the same uplink data packet more than once, without waiting for any feedback of previous transmission(s) of the same data packet." Advantages of PUSC retransmissions are an improvement in the overall reliability and a reduction in latency in comparison with HARQ, as no feedback is required. However, in general, no link adaptation is possible, and resource usage may be inefficient.

Figure 4:
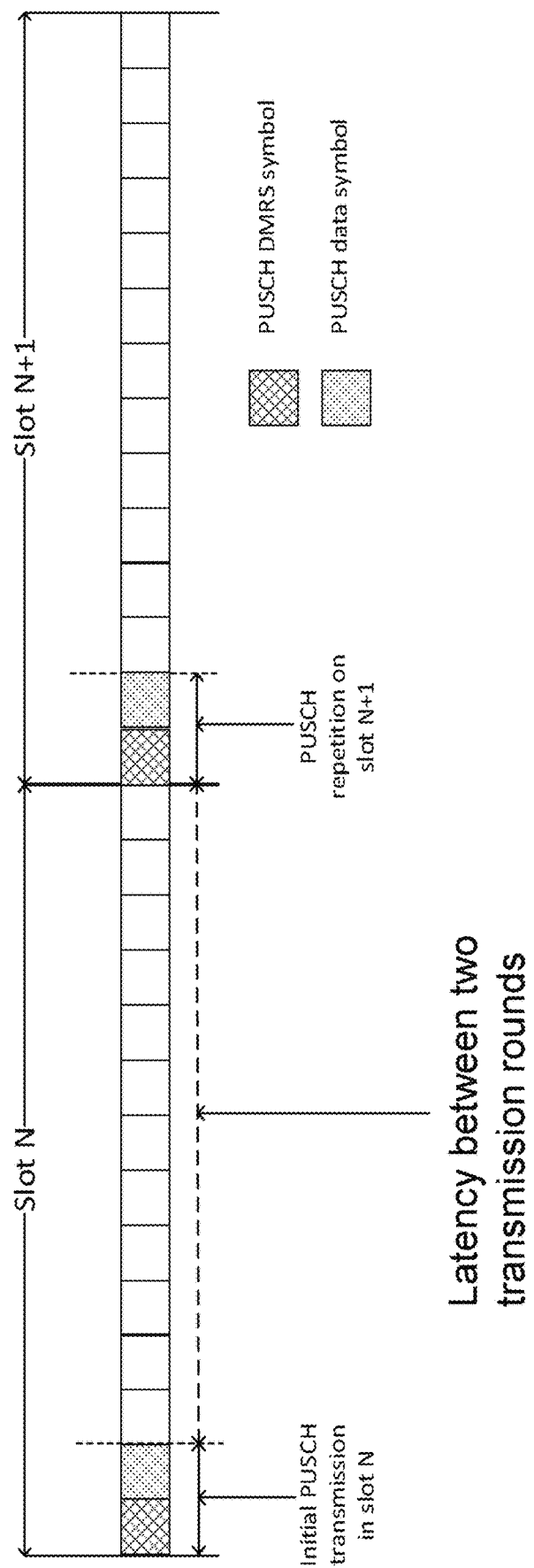
FIG. 4 is a diagram of an example of inter-slot repetition of 2-symbol PUSCH (Physical Uplink Shared Channel)

In NR Rel. 15, limited support for repetition is introduced. Only semi-static configuration of repetition is allowed. Moreover, repetition is allowed only between slots as shown in FIG. 4 (slot level PUSCH repetition). I.e., repetition is only possible in the slot following the slot of the previous transmission. Depending up on the numerology and service type (e.g., URLCC, eMBB), latency between the repetitions can be too long for inter-slot repetition. Such type of repetition is mainly useful for PUSCH mapping type A that allow the PUSCH transmission to start only from the beginning of the slot. Such limited support may not be able to achieve stricter latency requirements in NR Rel. 15 i.e., up to 0.5 ms latency. Therefore, repetition of PUSCH within the slot is being considered for NR URLLC in Rel. 16.

Repetition within the same slot can be supported for PUSCH mapping type B that allows the scheduling of a given transmission (or repetition from any symbol of the slot in contrast to only beginning of the slot in PUSCH mapping type A). For example, two repetitions can be scheduled adjacently within the slot as shown in FIG. 5, which provides even lower latency between repetitions in comparison to inter-slot repetition. In the figure, a single transmission consists of 1 DMRS and 3 data symbols, which is followed by exact same repetition.

However, it can be argued that the exact same configuration is achieved by even single transmission without repetition. Basically, the length of initial transmission is longer and additional DMRS symbol is configured, which is supported in NR Rel. 15, as shown in FIG. 6, with an additional DMRS in allocated to the fifth symbol of the slot. In the example shown in FIG. 6, a single transmission consists of 1 front-loaded DMRS+1 additional DMRS configuration and 6 data symbols which is practically same as repetition case.

Accordingly, supporting repetition within the same slot may be considered to provide the same functionality that can be achieved by single transmission with longer TTI (Transmission Time Interval) length. Therefore, to support and specify repetition of PUSCH within the slots, better functionalities with more flexibility and gains should be realized that cannot be achieved by existing support for PUSCH transmission.

Accordingly, it is desirable to improve mini-slot repetition within a slot to achieve more flexibility and gains that cannot be achieved by single assignment. It is therefore a proposal of the present disclosure that for PUSCH mapping type B, repetition of PUSCH within the same slot should be supported, only if additional functionalities with more flexibility and gains are realized in comparison with existing support for PUSCH transmission.

Repetition within a slot as such seems to provide similar functionality as single assignment. However, if it is combined with the other existing physical layer techniques, more flexibility with better gains could be achieved. Discussed below are some possible use-cases that could be achieved only if repetition within the slot is supported.

Figure 7:
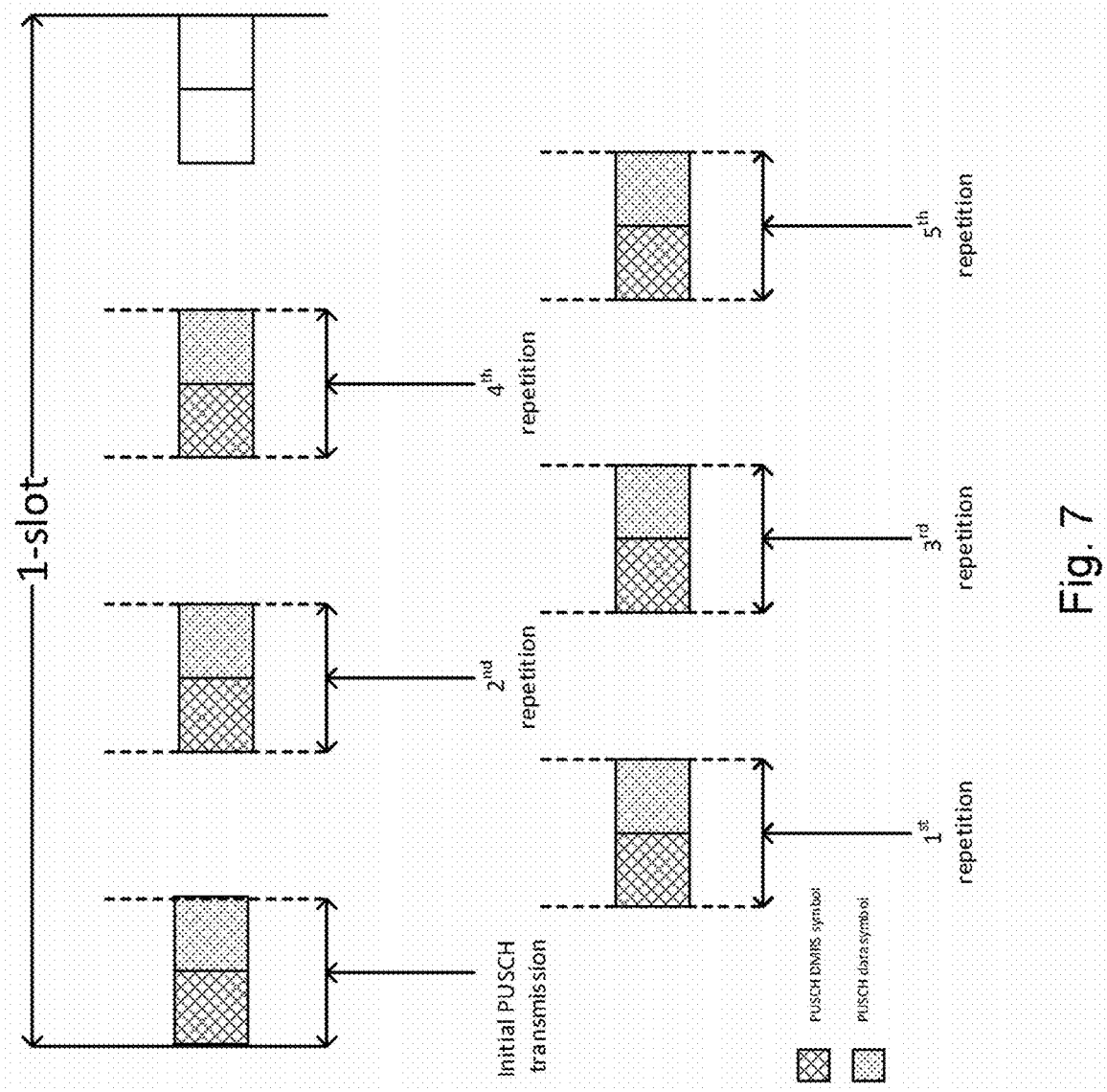
FIG. 7 is a diagram showing repetition with frequency hopping.

For PUSCH mapping type B, frequency diversity gains can be further exploited if frequency hopping between repetitions is allowed within a slot. It would give the flexibility to schedule each repetition on two or more hops depending up on the size of the bandwidth part, as shown in FIG. 7. Basically, more configurations could be possible in comparison to single transmission within a slot. Inter-frequency hopping may refer to hopping between subcarrier blocks comprising e.g., 12 subcarriers (corresponding to a Resource Block size in the frequency domain). However, frequency hopping may also refer to bandwidth part hopping. In accordance with section 4.4.5 of TS 38.211 V15.0.0 (2017-12), a bandwidth part (or carrier bandwidth part) is a contiguous set of physical resource blocks as defined in clause 4.4.4.3, selected from a contiguous subset of the common resource blocks defined in clause 4.4.4.2 for a given numerology on a given carrier.

Another benefit of using repetition within a slot is that each repetition can be transmitted on a different beam to achieve more spatial diversity gain which is not possible in case of single transmission, as shown in FIG. 8. Beamforming allows to concentrate the energy of a given radio transmission in a certain direction, such that the range can be extended to, for instance, compensate the high propagation loss in high frequencies. For example, if single transmission and 3 repetitions are allowed within a slot, then up to four different beams can be utilized for each transmission and thus attaining more spatial diversity and potentially improved reliability.

Figure 9:
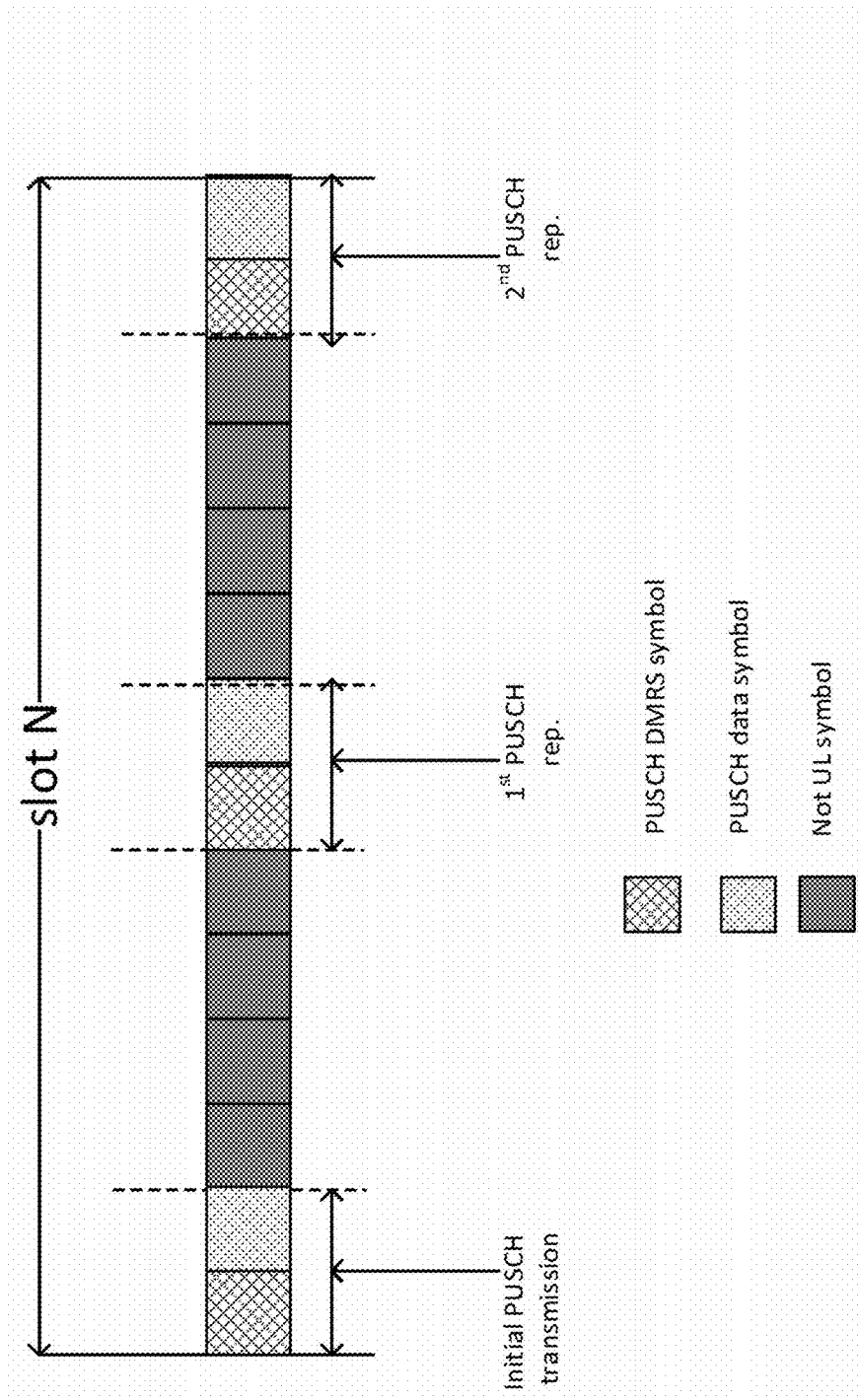
FIG. 9 is a diagram showing an example of a repetition on measurement resources in a configured grant.

In configured grant (also known as grant-free) PUSCH, all the allocated resources to PUSCH may or may not belong to uplink. Only the symbols that are indicated as UL could be used. Therefore, it may happen that the number of UL indicated symbols are not enough or contiguous to allow the transmission of longer PUSCH. Therefore, shorter PUSCH can be more efficiently scheduled and its repetition within the slot can utilize the non-contiguous symbols available for uplink, as shown in FIG. 9.

It is an observation of the present disclosure that for PUSCH mapping type B, repetition within the slot (i.e., a whole sequence of an initial transmission and repetitions performed in a single slot) can provide better flexibility and gains in combination with other physical layer techniques such as frequency hopping and beam hopping by exploiting frequency diversity and spatial diversity, respectively. Moreover, it is observed that for PUSCH mapping type B with configured grant, repetition within the slot allows to efficiently use measurement resources with a small number of UL symbols.

In conventional repetitions, the same transport block (TB) is transmitted in the initial transmission and all the repetition rounds along with same DMRS configuration. However, this might lead to sub-optimality in terms of DMRS overhead. For example, as shown in FIG. 10, in case of 2-symbol PUSCH with initial transmission and 6 repetitions, the DMRS overhead is 50%, which is very high. For every repetition round, the mini-slot consists of one data and DMRS symbols in a respective TTI, which is very inefficient in terms of resource usage as DMRS symbols are very frequent over the period of slot within which all of the initial transmission and the repetitions are performed.

Thus, it is observed that conventional repetition can lead to very high DMRS overhead in certain scenarios where the length of PUSCH is quite short. In other words, every repetition round corresponding to one of the subsequent TTIs/mini-slots consists of one data and DMRS symbols, which is very inefficient in terms of resource usage as DMRS symbols are very frequent over the period of slot. Accordingly, it is desirable to improve mini-slot repetition within a slot to improve latency and/or reliability in comparison with the conventional repetition mechanism.

On the other hand, even for high mobility UEs (i.e., UEs moving with high speed and therefore requiring frequent adaptation to rapidly changing channel characteristics), such high density of DMRS is not always required.

In view of the above observations and considerations, the disclosure proposes to allow, in mini-slot repetition of data within a slot, to change or vary DMRS allocation/DMRS symbol(s) allocation in at least one of the repetitions which is configured by a signaling mechanism. To this end, proposed transmission and reception devices and methods are described in the following aspects and embodiments of the disclosure.

It should be noted that the above motivation has made reference to the context of PUSCH repetitions and further referred to NR URLCC as a service type, the present disclosure is not limited to a particular service type or communication channel/link. In particular, as will be shown in the following description, the present disclosure is applicable to the uplink as well as the downlink case.

Figure 11:
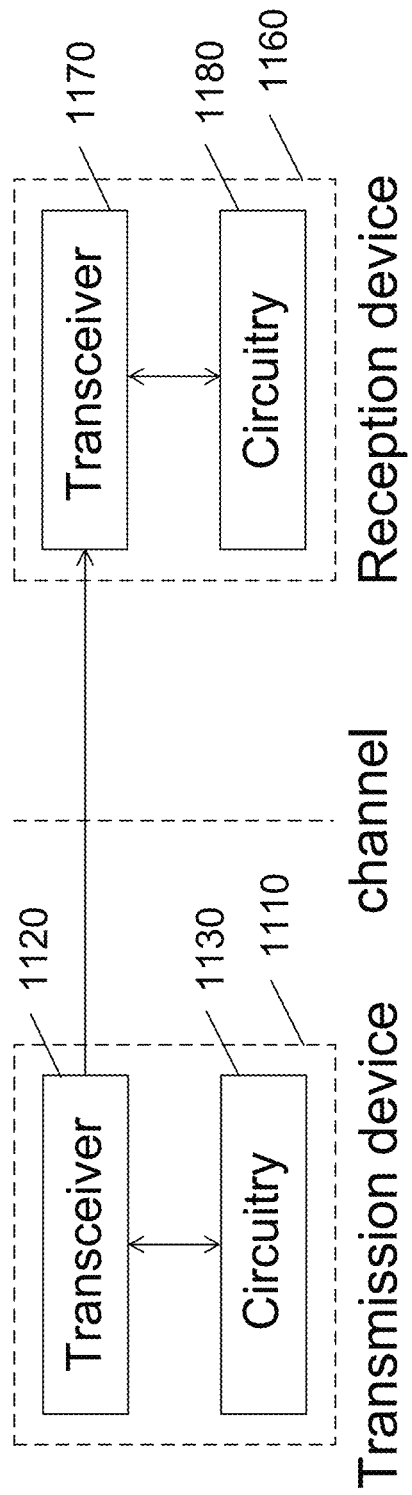
FIG. 11 is a block diagram of a transmission device and a reception device.
Figure 12:
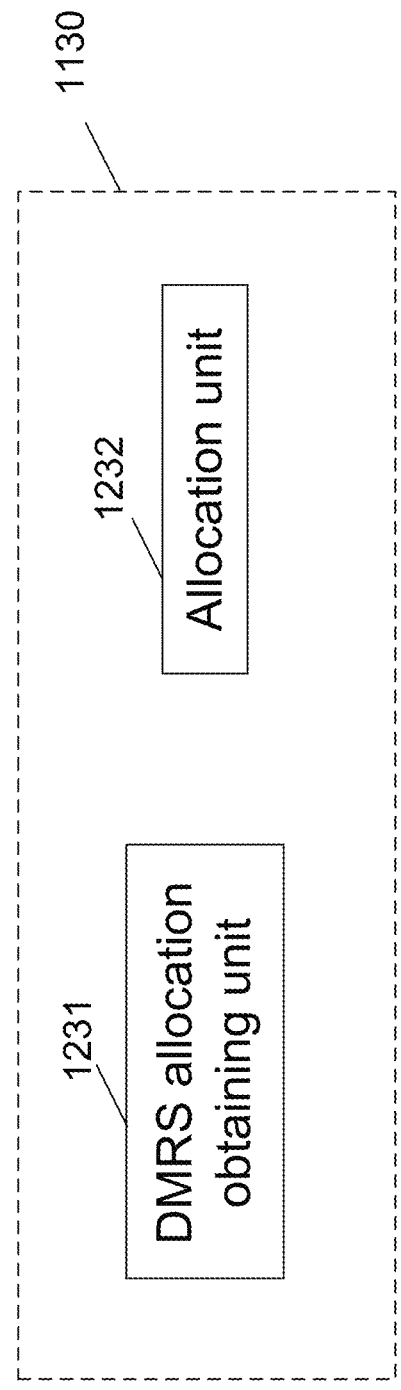
FIG. 12 is a block diagram of a circuitry of a transmission device.

In general, this disclosure provides a transmission device 1110 for transmitting data to a reception device 1160 over a channel (e.g., a wireless channel) in a communication system, particularly a wireless communication system. The transmission device 1110 shown in FIG. 11 comprises processing circuitry 1130 and a transceiver 1120. The processing circuitry, in operation, allocates the data to a plurality of transmission time intervals, TTIs. The plurality of TTIs respectively comprise a lower number of symbols than a slot. Therein, the data allocated to each of the plurality of TTIs is the same. In addition to the data, a demodulation reference signal (DMRS) is allocated to an initial TTI among the plurality of TTIs. Moreover, the circuitry 1130, in operation obtains a DMRS allocation for each of the subsequent TTIs of the plurality of TTIs which are subsequent to the initial TTIs, indicating whether or not no DMRS is allocated to the respective TTI. In this disclosure, devices or device parts adapted or configured to perform a given task are said to, "in operation," perform the given task. In accordance with the operation described, as shown in FIG. 12, the processing circuitry 1130 comprises a DMRS allocation unit obtaining unit 1231 which, in operation, obtains the DMRS allocation, and DMRS/data allocation unit which allocates data to the plurality of TTIs, allocates a DMRS to the initial TTI and allocates DMRS or no DMRS to the subsequent TTIs in accordance with the DMRS allocation obtained by the DMRS allocation obtaining unit 1231.

The DMRS allocation is an allocation scheme or allocation configuration which indicates for a TTI whether or not no DMRS is allocated to the respective TTI. I.e., the DMRS allocation indicates whether a DMRS is allocated to a TTI or not, to be transmitted in the respective TTI in addition to the data. Accordingly, if a DMRS allocation for one of the subsequent TTIs indicates that a DMRS is to be transmitted in the respective subsequent TTI, a DMRS is allocated to the TTI. However, if the DMRS allocation indicates that no DMRS is to be transmitted in the respective TTI, no DMRS is allocated to the TTI.

The transceiver 1120 (i.e., a transmitter and receiver, meaning hardware and software components of a transmission and or reception device adapted to transmit/receive a radio signal and modulate/demodulate data allocated to time and frequency resources of the radio signal) of the transmission device, in operation transmits within the slot, the data allocated to the plurality of TTIs to the reception device. Moreover, the transceiver 1120 transmits, in the initial TTI, the DMRS allocated to the initial TTI, and performs DMRS transmission in the one or more subsequent TTIs in accordance with the obtained DMRS allocation. I.e., on the one hand, in a subsequent TTI to which a DMRS is allocated, the DMRS and data are transmitted. On the other hand, in a subsequent TTI to which no DMRS is allocated, the data is transmitted, without transmitting a DMRS.

This disclosure further provides a reception device 1160 for receiving, from a transmission device 1110 over a channel (e.g., a wireless channel) in a communication system such as a wireless system, data. The reception device 1160 comprises circuitry 1189 and a transceiver 1170. The circuitry 1180 of the reception device, in operation, obtains a DMRS allocation, for each of one or more subsequent TTIs, i.e., TTIs subsequent to an initial TTI, subsequent TTIs and initial TTI being comprised by a plurality of TTIs respectively having a lower number of symbols than a slot. The data allocated each of the plurality of TTIs is the same. In accordance with the above description, the DMRS allocation for a TTI indicates whether or not no DMRS is allocated to the respective TTI to be received in addition to the data. The transceiver 1170 of the reception device 1160, in operation, receives, within the slot, the data and DMRS allocated to the initial TTI and the data allocated to the one or more subsequent TTIs from the transmission device, wherein DMRS reception in the one or more subsequent TTIs is performed in accordance with the DMRS allocation.

Figure 13:
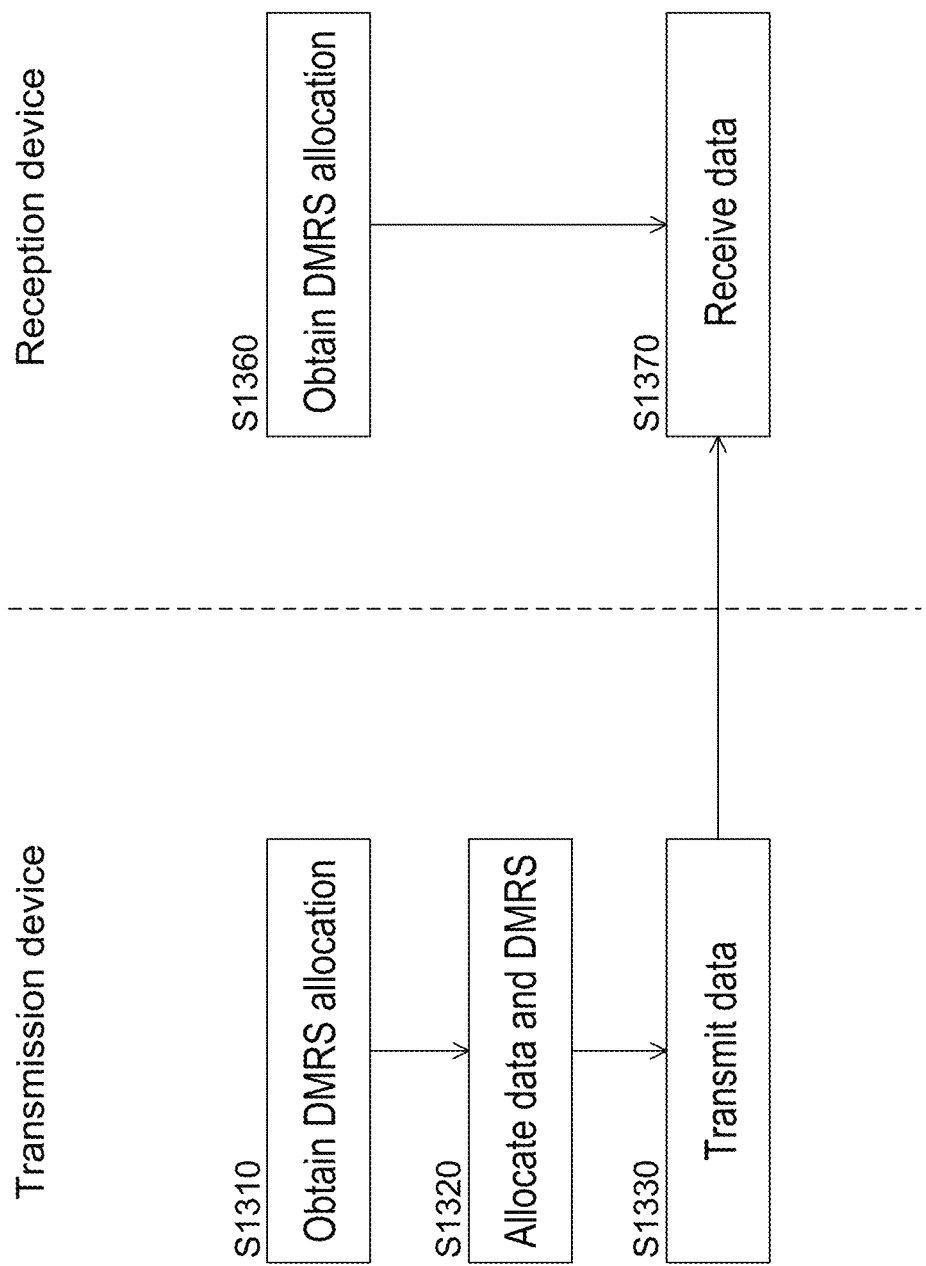
FIG. 13 is a flow chart of a transmission method and a reception method.

In correspondence with the above-describe transmission device 1110 and reception device, provided are a transmission method and respectively, a reception method shown in FIG. 13. Both the transmission method and the reception method comprise a step of obtaining S1310, S1360, a demodulation reference signal, DMRS, allocation for each of one or more subsequent TTIs subsequent to an initial TTI. The DMRS allocation indicates whether or not no DMRS is allocated to the respective TTI to be transmitted in addition to the data, wherein a plurality of TTIs including the initial TTI and the one or more subsequent TTIs respectively comprise a lower number of symbols than a slot. The transmission method further comprises the allocation step S1320 of allocating the same data to each of the plurality of TTIs, allocating a DMRS to the initial TTI and, if indicated by the DMRS allocation, allocating DMRS to one or more of the subsequent TTIs. The transmission method further comprises a transmission step S1330 of transmitting the data and DMRS allocated to the initial TTI and the data allocated to the one or more subsequent TTIs to the reception device, wherein DMRS transmission in the one or more subsequent TTIs is performed in accordance with the DMRS allocation. The reception method comprises the step S1370 of receiving, within the slot, the data and DMRS allocated to the initial TTI and the data allocated to the one or more subsequent TTIs from the transmission device, wherein DMRS reception in the one or more subsequent TTIs is performed in accordance with the DMRS allocation.

As described above, data and possibly reference signal are allocated respectively to transmission time intervals (TTIs) which are respectively smaller than a slot. Accordingly, the present disclosure particularly relates to non slot-based assignment described above. As mentioned, in non slot-based assignment, the minimum length of a TTI may conventionally be 2 OFDM symbols. Such two-symbol TTIs are shown in FIG. 10. The TTIs, which are smaller than a slot, are referred to in this disclosure as mini-slots, without limiting the disclosure to such terminology. In particular, due to the small size of the mini-slots TTIs, a complete sequence of repetitions including the initial transmission in the first two symbols (i.e., a DMRS symbol and a data symbol) and six repetition also respectively including a DMRS symbol and a data symbol fit into the slot, so that the whole series of repetitions is made within a single slot. Moreover, the present disclosure provides for TTIs to which no DMRS is assigned, i.e., TTIs that do not include a DMRS symbol. Accordingly, if a DMRS symbol is removed from a mini-slot having only one data symbol, the minimum size of the TTI will be one symbol rather than the two-symbols conventionally assumed.

Within a TTI/mini-slot to which a DMRS is allocated, a symbol to which a DMRS is allocated (DMRS) symbol precedes one or more symbols on which the data is transmitted. The DMRS is used on the receiver side for channel estimation for coherent demodulation. In general, it is also possible that a TTI comprises more than one DMRS symbol for DMRS retransmission preceding the data symbol(s) in which the data are transmitted.

However, in scenarios where the channel characteristics are not expected to change during the duration of one or two minis-slots in a manner that coherent demodulation is impaired, it may be sufficient to allocate a DMRS symbol to a first TTI prior to one or more subsequent TTIs, but not allocate any DMRS to the subsequent TTIs. I.e., in such a case, no DMRS is transmitted in at least one of the one or more subsequent TTIs/mini-slots subsequent to the initial TTI. Such non-allocation of DMRS to subsequent TTIs within a slot may be performed for example in use cases where transmission devices are expected to be non-moving or moving with low speed, such as factory automation.

Figure 14:
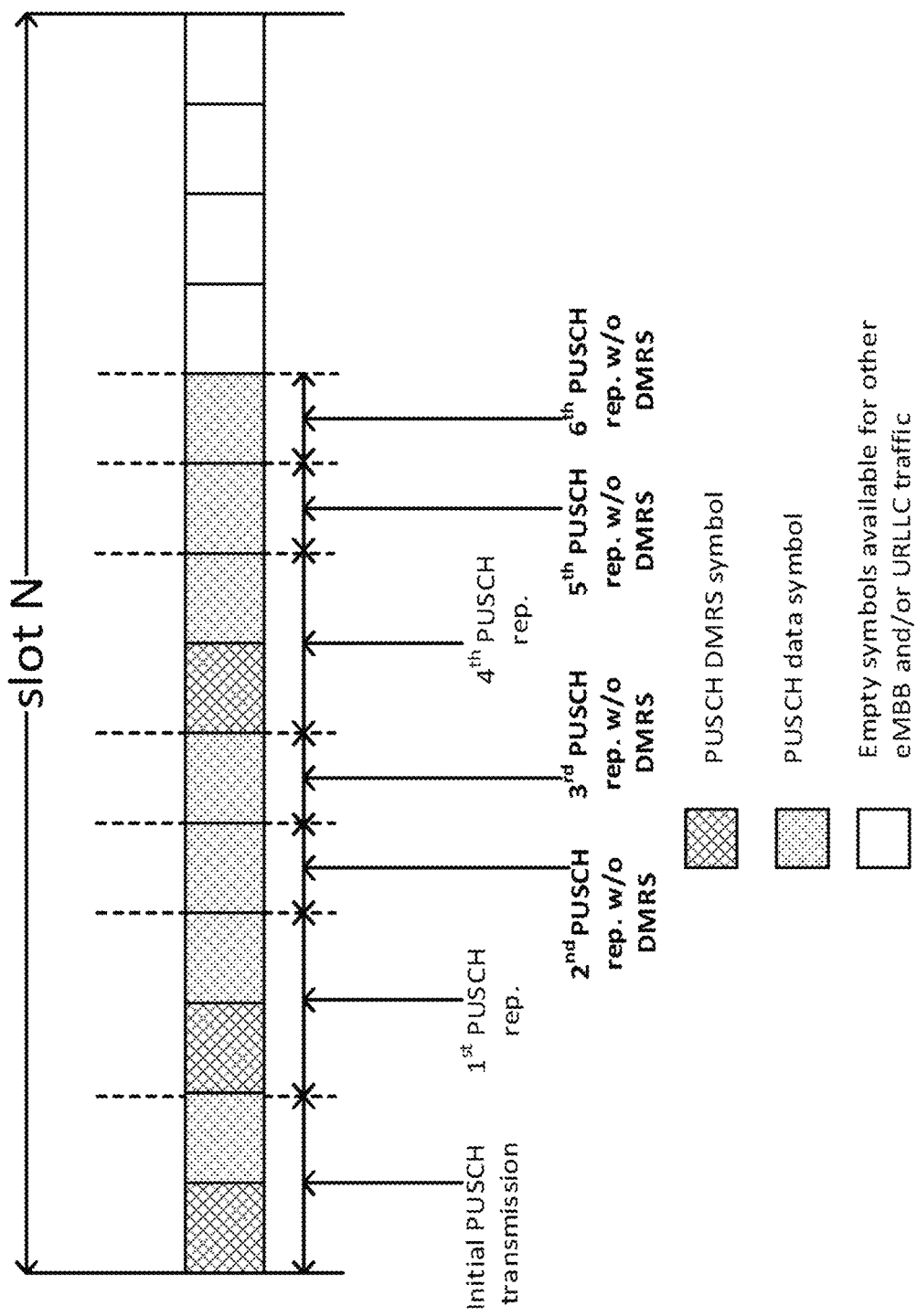
FIG. 14 is a diagram showing an example of removal of DMRS symbols from certain repetitions within a slot.

An example of a flexible DMRS allocation for data repetitions is shown in FIG. 14. The figure shows a slot including 14 symbols, the first ten symbols of which are occupied by a series of initial transmission and repetitions. An initial transmission in an initial mini-slot corresponds to the first two symbols and is followed by six data repetitions in six subsequent TTIs. In the first and fourth repetition, further DMRS are transmitted, i.e., the first and fourth subsequent mini-slots both comprise a DMRS symbol in addition to a data symbol. Accordingly, the DMRS allocation of the first and fourth subsequent TTI indicate respectively indicate that a DMRS is to be transmitted in these TTIs. On the other hand, according to the respective DMRS allocations of the TTIs corresponding to the second, third, fifth, and sixth repetitions, no DMRS is allocated to any of the latter TTIs.

A benefit of the transmission/reception devices and methods of the present disclosure is that flexible allocation and non-allocation of DMRS to mini-slots, such as flexible removal and/or replacement of DMRS with one or more data repetitions to be explained in the following, may allow configurations with more gain that are not possible with single assignment (i.e., the same DMRS allocation for each TTI of a repetition) due to limited existing DMRS configurations.

As has been described, the DMRS allocation scheme for a mini-slot, i.e., a TTI having less symbols than a slot, indicates or specifies whether or not a DMRS is allocated to a mini-slot, in particular to one or more symbols of the mini-slot (which generally include the first symbol in time order). A DMRS allocation is therefore also called a DMRS symbol(s) allocation in this disclosure. In the following, more details on possible DMRS symbol allocations will be provided. In particular, it will be described how data is allocated to the respective symbols of TTIs within a slot if the DMRS symbol allocation for at least one TTI within a slot specifies that no DMRS is allocated to the TTI.

So far, it has been described that in a series of DMRS repetitions in mini-slots within one slot, no DMRS is allocated to certain TTIs in which data repetitions are performed. In particular, flexible DMRS allocation or changing DMRS symbol(s) allocation according to some embodiments of the present disclosure may mean the following:

The DMRS symbol(s) in a given repetition is (are) removed, and only the data symbols(s) are transmitted in the respective TTI corresponding to the given repetition. Flexible removal of DMRS symbol(s) in one or more repetition(s) may facilitate reducing the latency to achieve a final target BLER in comparison with conventional repetition (i.e., repetition where a DMRS is allocated to each TTI in which a repetition is made).

The DMRS symbol(s) in a given repetition is (are) replaced with a data symbol(s), and the Transport Block (TB) corresponding to the data to be transmitted is sent with a reduced coding rate relative to the initial transmission. Flexible replacement of DMRS symbols(s) in one or more repetition may facilitate increasing the reliability in comparison with conventional repetition.

Removal and replacement of DMRS symbol(s) are combined. This may facilitate providing both latency and reliability improvements in comparison with conventional repetition.

Removal of DMRS

According to some embodiments, the DMRS allocation further indicates that if no DMRS is allocated to the respective TTI, a length of the respective TTI is reduced by one (or more) symbol(s) corresponding to the DMRS. That means, in the TTIs to which no DMRS is allocated, the DMRS symbol (or DMRS symbols) is removed.

Accordingly, one possible enhancement to conventional repetition is to allow the flexibility to remove DMRS from certain repetitions depending up on the channel conditions and reliability requirements. As an example, if it is allowed to remove DMRS from certain repetitions in case of 2-symbol PUSCH with initial transmission and 6 repetitions, one of the possibility could look like the above described allocation of data and DMRS to TTIs shown in FIG. 14. This flexibility will not only allow to control the DMRS overhead, but additionally give more flexibility in terms of DMRS configurations that are currently not supported in NR Rel. 15. Furthermore, the overall latency is also reduced by allowing such flexibility.

The repetition rounds without the DMRS corresponding to mini-slots/TTIs without DMRS symbol will use the last available DMRS for channel estimates. In particular, 2nd and 3rd repetitions are without DMRS and they use DMRS from the 1st repetition for demodulation. Similarly, 5th and 6th repetition are without DMRS and they use DMRS from the 4th repetition for demodulation.

In terms of demodulation performance, there should be negligible difference for the repetitions without the DMRS, in particular in applications with low mobility requirements for transmitting devices such as UEs, because the distance with the last available DMRS from the previous repetitions is still rather low. Moreover, in the initial data transmission as well as in each of the repetition rounds, the same MCS (modulation and coding scheme), in particular the same coding rate, may be used because the same amount of data symbols is available in the initial TTI as well as in each of the one or more subsequent TTIs, e.g., one data symbol per transmission.

Such a configuration, in particular data/DMRS allocation to symbols within one slot, is not possible according to currently supported DMRS configurations for single assignment. For such a configuration, the performance may be similar or improved in comparison with the current configurations for single transmission.

Furthermore, in comparison with conventional repetition, the same reliability can be achieved with a reduction in latency. For instance, as shown in FIG. 14, the latency is reduced by four symbols.

Moreover, resources, in particular resources of the time domain, can be saved with respect to conventional repetition. While for conventional repetition, all fourteen symbols of a slot are consumed for a series of an initial transmission and six repetitions, according to the current embodiment, some symbols in a slot may be unused by the series of initial transmission and repetitions (e.g., the four last symbols of the slot shown in FIG. 14) and can be used for other transmissions, for example other URLLC traffic in the queue for same or other UEs.

Accordingly, with particular respect to PUSCH mapping type B mentioned above, it is a further observation of the present disclosure that for repetition within the slot for PUSCH mapping type B, removal of DMRS from certain repetition rounds will allow to reduce the DMRS overhead and provide more flexibility in terms of DMRS configurations, which are not possible currently in NR Rel. 15. An additional observation is that for repetition within the slot for PUSCH mapping type B, removal of DMRS from certain repetition rounds will also allow to reduce the overall latency and make the resources available for other traffic in the pipeline, e.g., URLLC/eMBB. Accordingly, possible latency improvements may further be advantageous in view of pre-emption discussed above. A delay of a transmission pre-empted by a sequence of repetition may be reduced along with the latency.

Replacement of DMRS

According to some embodiments, the DMRS allocation for a TTI from among the one or more subsequent TTIs further indicates that if no DMRS is allocated to respective TTI smaller than a slot, a symbol for allocation of the DMRS in the respective TTI is replaced by a symbol for allocation of the data. In other words, in a mini-slot, a DMRS symbol is replaced by a data symbol.

Figure 15:
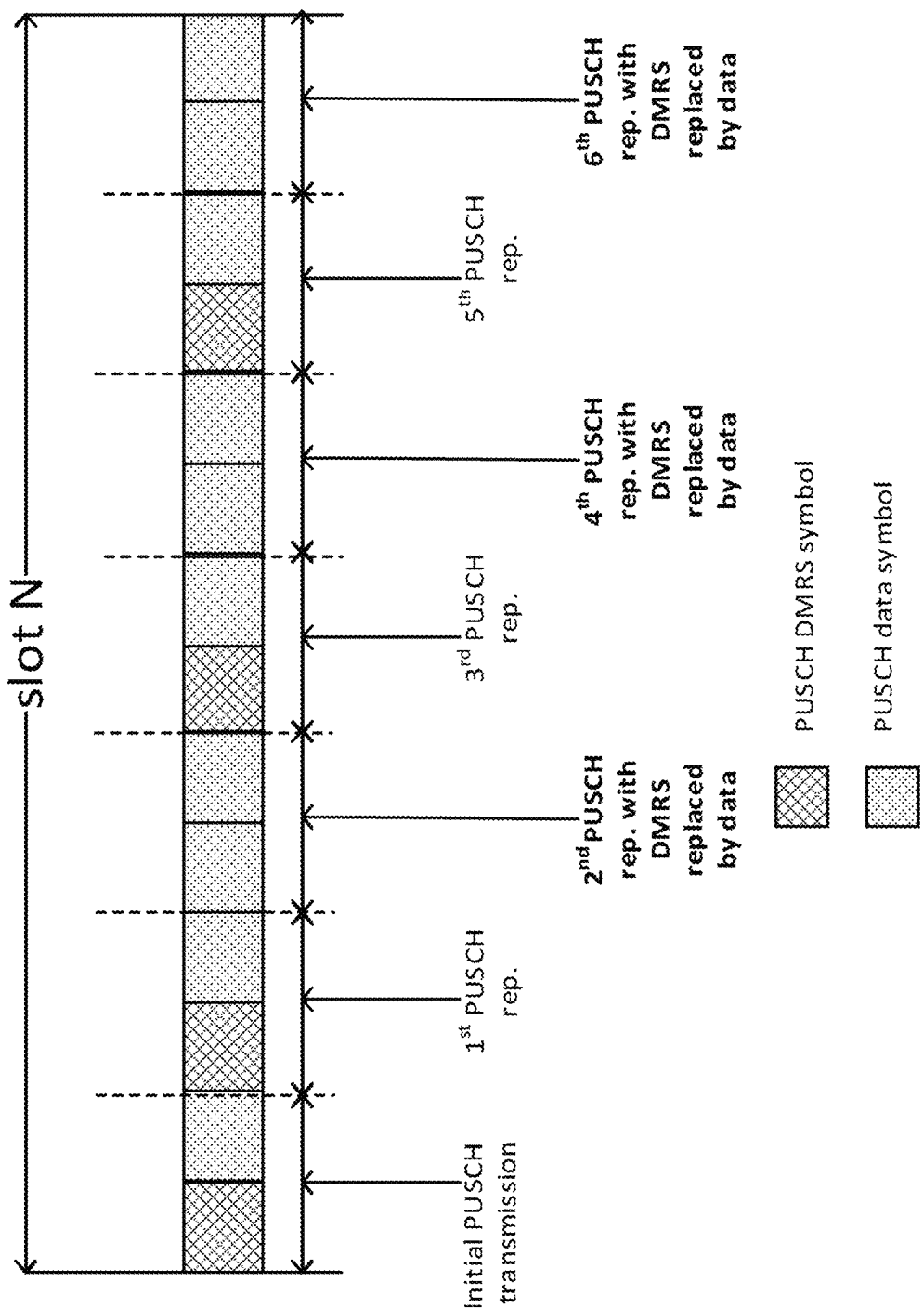
FIG. 15 is a diagram showing an example of replacement DMRS symbols by data symbols in certain repetitions within a slot.

An exemplary allocation of DMRS and data to symbols of TTIs within a slot where DMRS symbols are replaced by data symbols is shown in FIG. 15. The slot comprises seven mini-slots each comprising two symbols. The first (initial) mini-slot in which the initial PUSCH transmission is performed as well as the subsequent TTIs on which the data for the first, third and fifth repetition are allocated respectively comprise a DMRS symbol and a data symbol. However, the second, fourth, and sixth repetitions are respectively without data symbol. In the TTIs corresponding to these repetitions, the DMRS are respectively replaced with data symbols. Thus, each of the second, fourth and sixth subsequent mini-slot includes two data symbol than one data symbol preceded by a DMRS symbol.

With a DMRS allocation scheme for repetitions within a slot, a principle can be applied to reduce the MCS (i.e., the coding rate) in certain repetitions to improve the coding gain, while at the same time keeping desired demodulation performance by preventing the distance between data symbols and DMRS from being long. As can be seen from FIG. 15, when a DMRS symbol is replaced by a data symbol in a TTI having two symbols, the number of symbols available for transmission is doubled. Moreover, the same data are transmitted in each repetition. Accordingly, in the two-symbol example, the coding rate can basically be reduced to half the coding rate of the initial data transmission in all repetitions where the changes, i.e., the replacement of a DMRS symbol by a data symbol, apply. However, as the present disclosure is not limited to a TTI having two symbols, the decreased coding rate may also take other values than half of the original coding rate by which the data is coded in the initial TTI and the subsequent TTIs including DMRS symbols.

In comparison with single assignment where such configurations as exemplified by FIG. 15 are not possible according to current DMRS configurations, a configuration where DMRS symbols are replaced by data symbols, a similar or even better performance may be obtained. Moreover, in comparison to conventional repetition, the reliability may further be improved while keeping the latency the same.

As has been described above, DMRS symbols may be removed or replaced from certain TTIs within a slot. For instance, within a single slot or a sequence of slots, the change in the DMRS symbol(s) allocation may be restricted either to removal of DMRS symbols or replacement of DMRS symbols. I.e., within such slots, if no DMRS is allocated to one more subsequent TTIs, only removal is performed, or only replacement is performed. However, as will be described in the following embodiments, removal and replacement of DMRS symbols may also be combined with respect to different TTIs within a single slot.

Combination of Removal and Replacement

For instance, according to some embodiments, the DMRS allocation further indicates that if no DMRS is allocated to the respective TTI, either a length of the respective TTI is reduced by one symbol corresponding to the DMRS (removal of DMRS symbol) or a symbol for allocation of the DMRS in the respective TTI is replaced by a symbol for allocation of the data (replacement of DMRS symbol). Accordingly, among the one or more subsequent TTIs on which the data is to be transmitted repeatedly within a slot, a configuration is possible DMRS symbol removal is applied to one of the subsequent TTIs, whereas DMRS symbol replacement is applied to another one of the subsequent TTIs, irrespective of the order of these TTIs in time direction. i.e., a TTI in which the DMRS symbol is removed may precede a TTI in which the DMRS symbol is replaced in transmission order, or vice versa.

Figure 16:
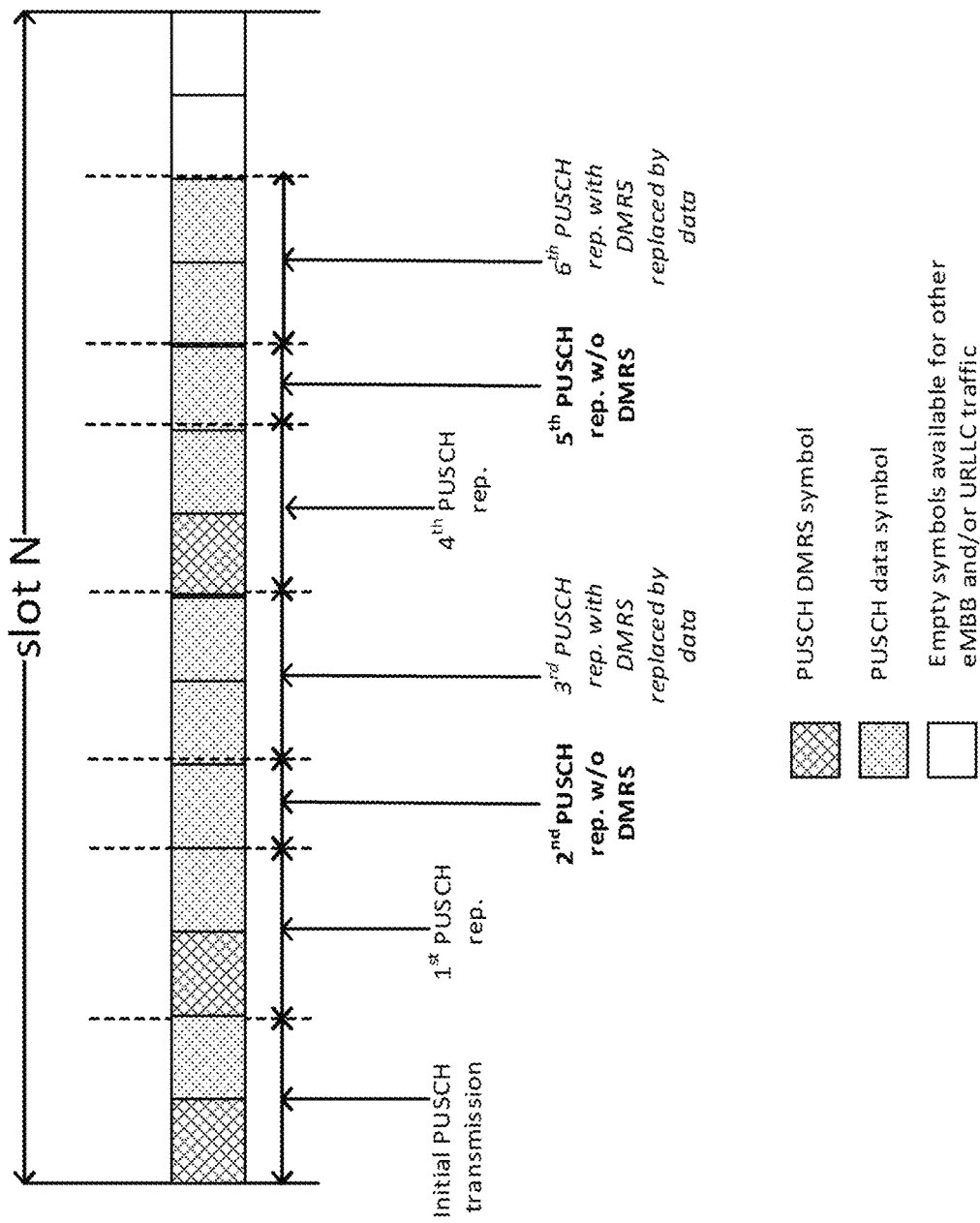
FIG. 16 is a diagram showing an example of a combination of removal and replacement of DMRS symbols within a slot.

A slot in which both removal and replacement of DMRS symbols are performed in different TTIs included in the slot is shown in FIG. 16. In particular, the second and fifth subsequent mini-slots in which the second and fifth repetitions are performed, are without DMRS symbol, and the length of these mini-slots is reduced accordingly. The third and sixth subsequent mini-slots corresponding to the third and sixth repetitions, are without DMRS symbol as well, wherein the DMRS symbol is replaced by a further data symbol. In the third and sixth repetitions with respectively two data symbols, the code made may be reduced to half, as described above. Moreover, as can be further be seen, the last two symbols of the slot in time order are unused for the sequence of initial transmission and repetitions and thus available for other traffic in the pipeline.

Such a hybrid use of DMRS symbol removal and DMRS symbol replacement by data symbols may facilitate increasing the reliability and at the same time reduce the latency with respect to conventional repetitions. While removal of DMRS symbols may provide latency improvements, whereas replacement of DMRS symbols accompanied by a reduction of the coding rate may facilitate increasing the reliability, a combination of these embodiments provides greater flexibility and allows for tradeoffs between the different aims.

As has been mentioned, in some embodiments, if a symbol for allocation of the DMRS in the respective TTI is replaced by a symbol for allocation of the data, the data is transmitted in the respective TTI with a code rate lower than a code rate (or coding rate) by which the data is transmitted in the initial TTI. For instance, as shown, the lower code rate may be half the code rate by which the data transmitted in the initial TTI/mini-slot is coded, but the disclosure is not limited to reducing the coding rate by one half. Alternatively, if the initial TTI comprises two data symbols and one DMRS symbol and a subsequent TTI has three data symbols and no DMRS symbol, the coding rate may be reduced to two thirds of the coding rate used in the initial transmission. As has been described, the mentioned reductions in the coding rate are to be understood as relative to the coding rate of the data in the initial TTI rather than a reduction of an absolute coding rate 1 to e.g., ½. i.e., the described decrease in the coding rate is independent from the original value of the coding rate.

Uplink Transmission and Repetitions

Some examples have been shown in which a sequence of initial transmission and repetitions constitute uplink transmissions, such as PUSCH (physical uplink shared channel) transmissions. Accordingly, in some embodiments, the transmission device 1110 (in particular the transceiver 1120 of the transmission device 1110 in operation) transmits the data to the reception device on an uplink, and the transceiver 1120 of the transmission device 1110 further receives from the reception device 1160 control signaling. Correspondingly, the reception device 1160 transmits the control signaling to the transmission device.

The control signaling includes an allocation indicator for each of the subsequent TTIs indicating the respective DMRS allocation. The circuitry 1130 of the transmission device, obtains the DMRS allocation for each of the TTIs subsequent to the initial TTI by evaluating the control signaling.

In embodiments where the transmission device 1110 transmits the data to the reception device 1160 on the uplink, the transmission device may be a terminal or user equipment, the reception device 1160 may be may be a base station which is referred to in NR (New Radio) communication systems as gNB or gNodeB in correspondence with the eNodeB (eNB) of LTE (Long Term Evolution) or LTE-Advanced systems. The data transmission on the uplink may correspond to an initial PUSCH transmission and one or more repetitions.

Figure 17:
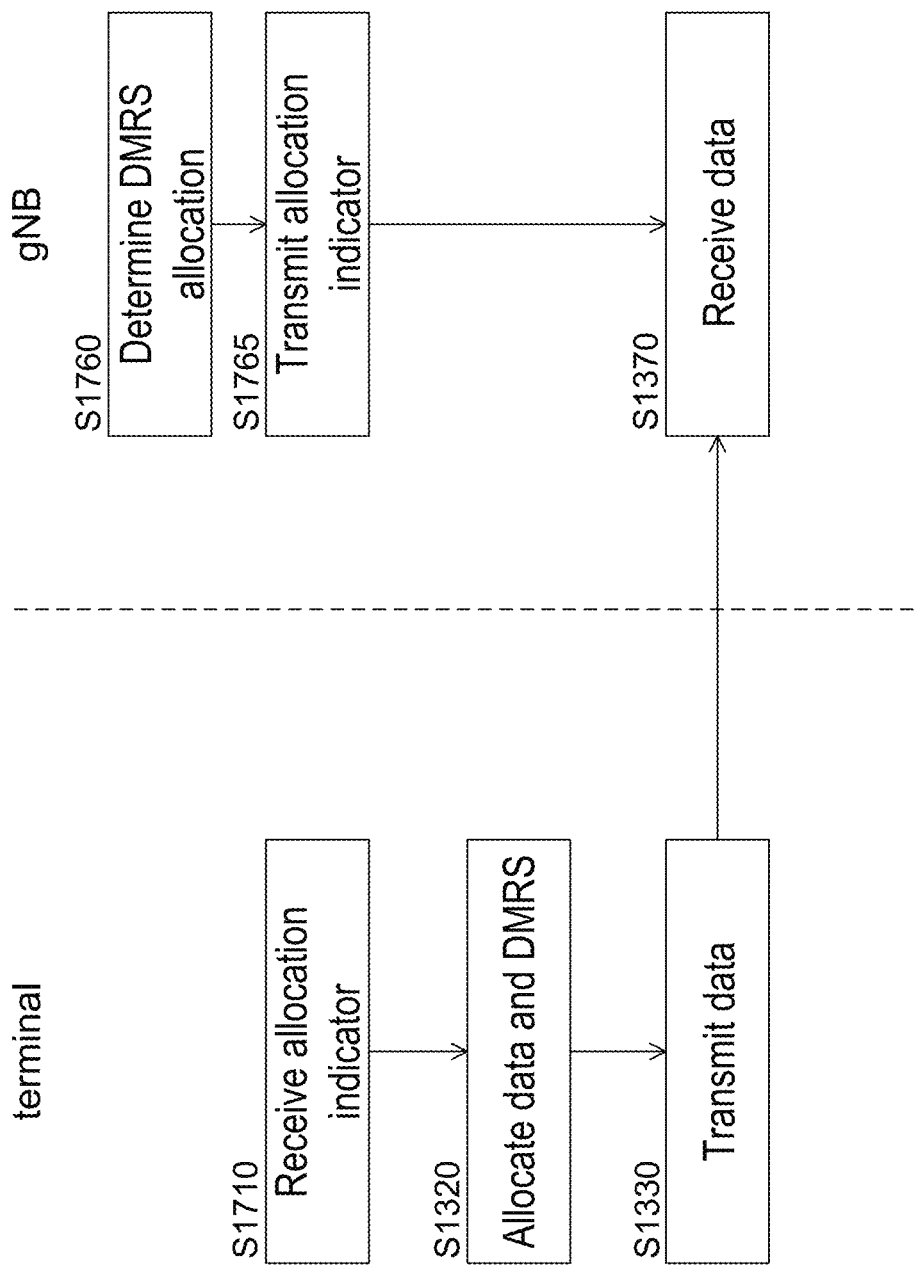
FIG. 17 is a flow chart of an uplink transmission method and an uplink reception method

An uplink transmission method and an uplink reception method according to the present disclosure are shown in FIG. 17. As shown a gNB corresponding to the reception device 1160 obtains the DMRS by a determination step S1760 of determining the DMRS allocation (embodying step S1360 of FIG. 13). In particular, such a determination of a DMRS allocation is performed based on channel quality estimation. In particular, the base station may estimate the channel quality based on uplink sounding reference signals (SRS) which UEs transmit for the purpose of channel quality estimation. The gNB may receive SRS from one or more UEs and determine the DMRS allocation based on the channel conditions corresponding to the channel quality estimated based on the received SRS.

The gNB/base station then generates a DMRS allocation indicator and transmits, in step S1765, the control signaling including the allocation indicator to the (user) terminal. The user terminal receives the control signaling including the DMRS allocation indicator in step S1710 (embodying step S1210 of FIG. 13) and thereby obtains the DMRS allocation. The allocation step S1320 and the transmission step S1330 of the uplink transmission method and the reception step S1370 of the uplink reception method are performed in accordance with the corresponding general methods shown in FIG. 13.

Control Signaling

In particular, in some embodiments, the DMRS allocator for each of the one or more subsequent TTIs is a two-bit allocation indicator. Two bits are sufficient to indicate whether or not no DMRS is allocated to the TTI and to further indicate which of the options removal of the DMRS or replacement of the DMRS is applied. Accordingly, each repetition may be respectively associated with one of two bits of the following indication.

Figure 18:
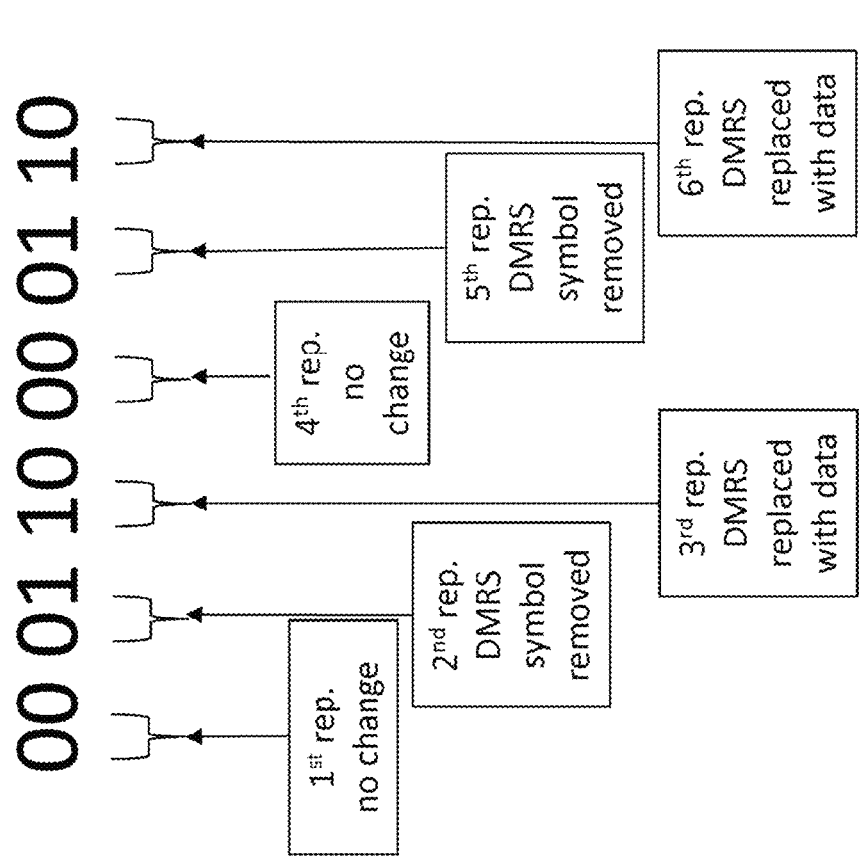
FIG. 18 is a graph showing exemplary control signaling of DMRS allocation

'00': no change to DMRS symbol(s) in a given repetition (i.e., DMRS is allocated to the TTI)
'01': DMRS symbol(s) to be removed and the TTI length of given repetition is reduced
'10': DMRS symbol(s) to be replaced with data symbol(s) and the coding rate of the given repetition is reduced
'11': reserved entry In accordance with the above two-bit indication, a DMRS allocation indicator for six repetitions consists of six two-bit indicators. For the example of the combination of removal and replacement of DMRS symbols shown in FIG. 16, the resulting twelve-bit indicator reads "00 01 10 00 01 10." This indicator is also shown in FIG. 18.

Clearly, the association between two-bit values and DMRS allocations is merely exemplary. Alternatively, for instance, '10' may denote DMRS symbol(s) removal.

Alternatively, the DMRS allocation indicator may have more or less than two bits. In particular, the DMRS allocation indicator for each of the subsequent TTIs to be transmitted within a slot may be a one-bit indicator, resulting in a six-bit field for the indication of DMRS allocations of a maximum of six retransmissions. A one-bit indicator corresponding to a TTI is sufficient to indicate whether or not a DMRS is allocated to the respective TTI, provided it is clear or known, for example from a standard or from further control signaling, what particular modifications are made to the allocation in the TTI, e.g., whether removal or replacement of the DMRS symbol is performed. For instance, a bit value of "0" may indicate that a DMRS is allocated to and transmitted in the respective TTI, and "1" may indicate that no DMRS is allocated, irrespective of whether the DMRS symbol is replaced or removed. Accordingly, the resulting six-bit DMRS allocation indicator for all six repetitions would read "011011" for the example shown in FIG. 14 (removal), and "010101." Again, the values of "0" and "1" may be switched, in which case "1" would mean allocation of a DMRS to the respective TTI.

For example, the DMRS allocation indicator (e.g., the above described one-bit or two-bit indicator for a respective TTI) may be included in higher signaling. Accordingly, the DMRS allocation is signaled semi-statically, particularly in RRC (Radio Resource Control) signaling.

In some embodiments, the control signaling further includes a DMRS activation indicator which indicates whether or not no DMRS is allocated to any of the one or more subsequent TTIs. Accordingly, the DMRS activation indicator, which may be a one-bit indicator may indicate whether flexible repetition configuration (allocation or non-allocation of DMRS to subsequent TTIs as well as the types of non-allocation) is applied or not. In other words, the DMRS activation indicator is set for deactivating or activating flexible DMRS configuration Moreover, the choice of a particular DMRS activation indicator may indicate the degree of flexibility in DMRS allocation.

In particular, the DMRS activating indicator may be a one-bit indicator, which indicates whether flexible DMRS is applied within a slot or even a greater time interval comprising several slots (e.g., the activation indicator may be semi-statically signaled, as will be described later). For instance, "0" indicates that flexible repetition allowing non-allocation of DMRS to certain TTIs is not applied, and "1" indicated that flexible repetition is applied (or vice versa). The one-bit activation indicator may be used in combination with respective two-bit indicators for the particular TTIs of a series of repetitions describes above. For example, if the DMRS activation indicator indicates that flexible indication is applied, the two-bit indicators may specify whether DMRS allocation, DMRS removal or DMRS replacement is applied with respect to a particular TTI within a slot.

Alternatively, a one-bit activation indicator may indicate whether DMRS removal or DMRS replacement is applied (e.g., "0" indicates removal and "1" indicates replacement). In this case, the or not the non-allocation of a DMRS (in particular the removal or replacement, depending on the value of the DMRS activation indicator) may be indicated by means of 1-bit DMRS allocation indicators for the respective TTIs.

The activation indicator may be included in higher-layer signaling. Alternatively, the activation indicator may be included in downlink control information (DCI), which may be considered as dynamic signaling to carry e.g., scheduling information (grants) and/or transmission parameters, i.e., in physical layer control signaling messages transmitted on the PDCCH (Physical Downlink Control Channel Information). The present disclosure is not limited to a particular DCI format, rather, the format may correspond to the existing/specified DCI formats for NR or could be agreed for particular service typed such as URLLC in the future. On the one hand, including the activation indicator in the DCI provides greater flexibility as the activation/deactivation of flexible DMRS allocation can be performed with a grant for a sequence of data repetitions. On the other hand, signaling the activation indicator in higher-layer signaling rather than DCI may avoid introducing further DCI signaling and thus generating DCI signaling overhead. However, if the DMRS allocator is to be included in the DCI, advantageously a one-bit allocation indicator is used.

The above described control signaling including DMRS allocation indicators for respective TTIs and the activation indicator constitute a signaling mechanism which can be embodied via RRC-signaling (semi-static configurability) only. On the other hand, the signaling mechanism may be embodied to as a combination of both RRC and DCI signaling, as will be described in the following.

If the configuration of the DMRS allocation/activation is performed only by means of RRC signaling, two bit fields, (referred to as "bit field 1" and "bit field 2" in this disclosure) may allow complete flexibility in allowing removal or replacement of DMRS symbols in any of the repetition rounds, i.e., flexibly specifying in which order removal, replacement or allocation are respectively performed within sequences of repetitions.

The bit field 1 may be correspond to the above-described one-bit activation indicator to indicate whether flexible repetition configuration is applied or not. The exact repetition configuration (DMRS allocation) is configurable by bit field 2 corresponding to the two-bit allocation indicators being provided respectively for the TTIs. In bit field 2, the number of maximum bits will be two times the number of maximum allowed repetitions. For example, if a maximum of six repetitions are allowed, then 12 bit field is defined in the RRC to allow flexible repetition configuration. Each repetition, i.e., each subsequent TTI is then associated with two bits having the indication as listed above in the description of the DMRS allocation indicator. Accordingly, returning to the example of combination of DMRS removal and replacement shown in FIG. 16, bit field 1 has value "1"—indication that flexible repetition is applied, and bit field 2 takes the value "00 01 10 00 01 10," as described above and shown in FIG. 18.

As an alternative to bit field 1 being a 1 bit field and bit field two being a field of up to twelve bits, a one-bit bit activation indicator indicating whether DMRS replacement or DMRS removal is applied may be combined with respective one-bit DMRS allocation indicator for the subsequent TTIs described above. As a further alternative, a two-bit activation indicator as described above may also be combined with respective one-bit allocation indicators. In the latter signaling mechanisms, a bit field 2 of up to 12 bits may be reduced by half the bits to a field of up to six bits. Accordingly, resources in the RRC signaling are saved.

Furthermore, in accordance with the present disclosure, signaling of DMRS allocation(s) for the respective TTIs corresponding to repetitions can also be performed without bit field 1. In particular, the control signaling relating to the DMRS allocation may only include the DMRS allocation indicators. However, if the activation indicator is included in the RRC control signaling and indicates the value "0" (flexible repetition not applied), the bit field 2 need not be signaled in the same RRC signaling, and the bits can be saved or reused for indications other than DMRS allocation.

As an alternative to control signaling of a DMRS allocation/activation in the RRC only, a signaling mechanism may include both RRC signaling and DCI signaling. Such embodiments may allow for a dynamic nature of DMRS allocation to some degree.

In particular, the field referred to as "bit field 1" may be moved to the DCI, i.e., a one-bit field corresponding to one of the above-described one-bit activation indicators is added to the DCI to dynamically signal whether flexible repetition configuration (which in this case is still configurable by an RRC bit field) is applied (DCI bit field value "1") or not (value "0"). When control signaling in RRC and DCI are combined, the RRC bit field in the RRC signaling may be the same as "bit field 2" describe above with respect to the usage of RRC only. Accordingly, the repetition configuration pattern (i.e., the respective DMRS allocations of the subsequent TTIs) is the same, but its application (i.e., (de)activation, "switching" flexible DMRS allocation on or off) is dynamic is performed dynamically via DCI.

The one-bit field in the DCI may be the one-bit activation indicator which specifies activation or deactivation of flexible DMRS allocation, as described above. In this case, the bit field in the RRC signaling may correspond to the two-bit DMRS allocation indicators as described above (up to twelve bits for up to six repetitions) which also indicate whether DMRS symbol replacement or DMRS symbol removal is applied. However, the one-bit field in the DCI may also correspond to the above-described indicator which indicates whether DMRS removal or DMRS replacement is to be applied. In this case, the DMRS allocation indicator may have one bit per subsequent TTI, as described above (up to six for up to six repetitions). As a further alternative, the type of symbol allocation in case no DMRS is allocated to a repetition (replacement or removal) may also be predefined, e.g., by a standard. In this case a one-bit activation indicator in the DCI and a one-bit DMRS allocation indicator per subsequent TTI (e.g., six bits corresponding to six repetitions) is sufficient.

Further Embodiments

Some of the above embodiments have been described in particular with respect to uplink transmissions/repetitions. However, as already mentioned, the present disclosure is not limited to the uplink case and may also be used in association with PDSCH repetitions. Accordingly, in some embodiments, the transmission device rather than the reception device corresponds to the gNB, The transmission generates a DMRS allocation indicator and optionally the activation indicator and transmits control signaling including the allocation indicator to the reception device, i.e., the (user) terminal. The reception device further receives the DMRS allocation indicator (and possibly the activation indicator), and receives the data in the initial TTI, and receives the DMRS in the subsequent TTIs in accordance with the DMRS allocation indicated by the received DMRS allocation indicator (and possibly, the activation indicator). Herein, Activation indicator and allocation indicator may correspond to any of the indicators previously discussed for the uplink case.

Furthermore, it should be noted that the present disclosure is directed at enabling flexibility in the time domain. The allocation of the data and DMRS to carriers or subcarriers, i.e., resources in the frequency domain of an OFDM system, or other resources such as spatial resources (beams), is not affected by DMRS allocation.

Figure 19:
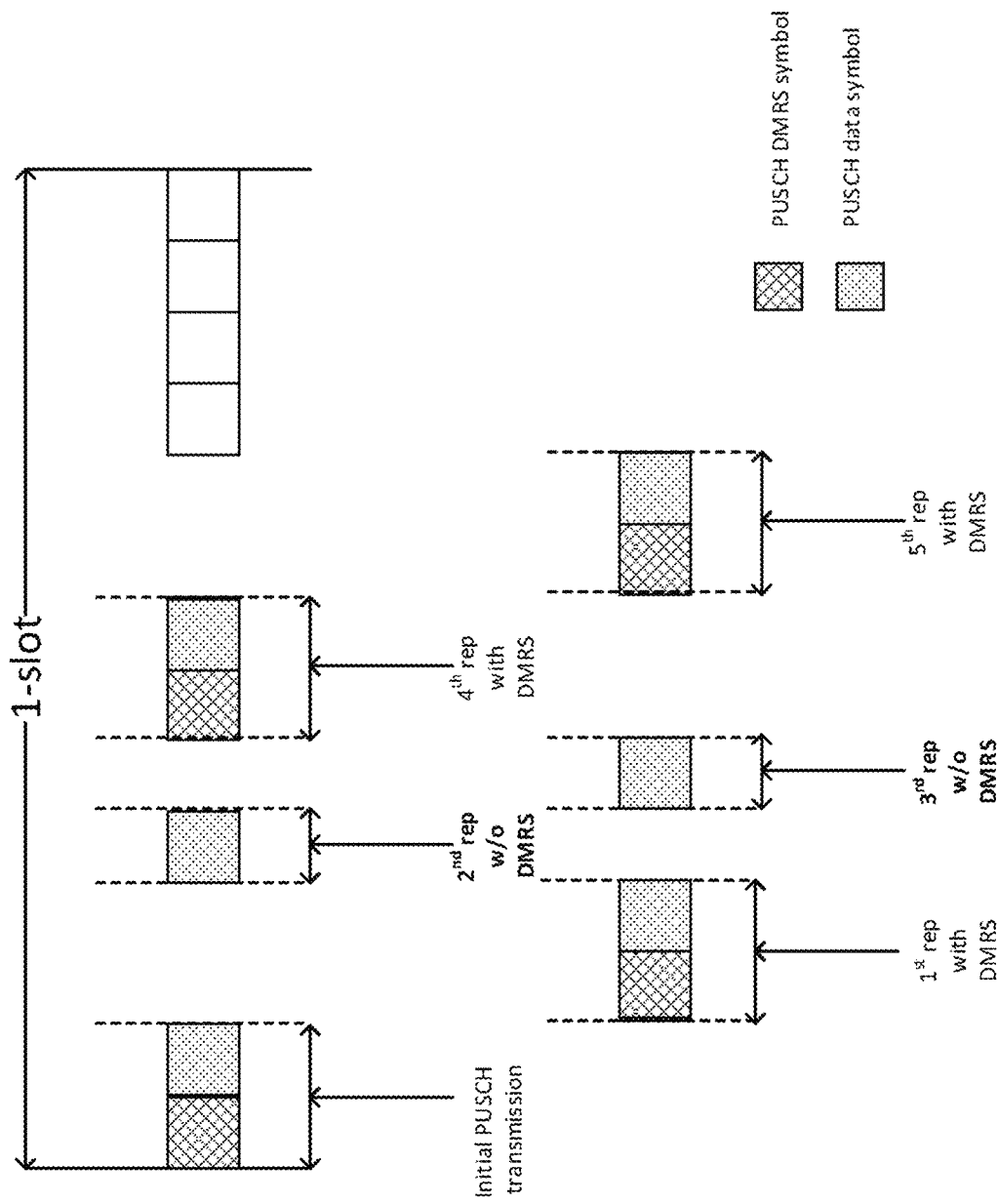
FIG. 19 is a diagram showing an example of repetition with frequency hopping.
Figure 20:
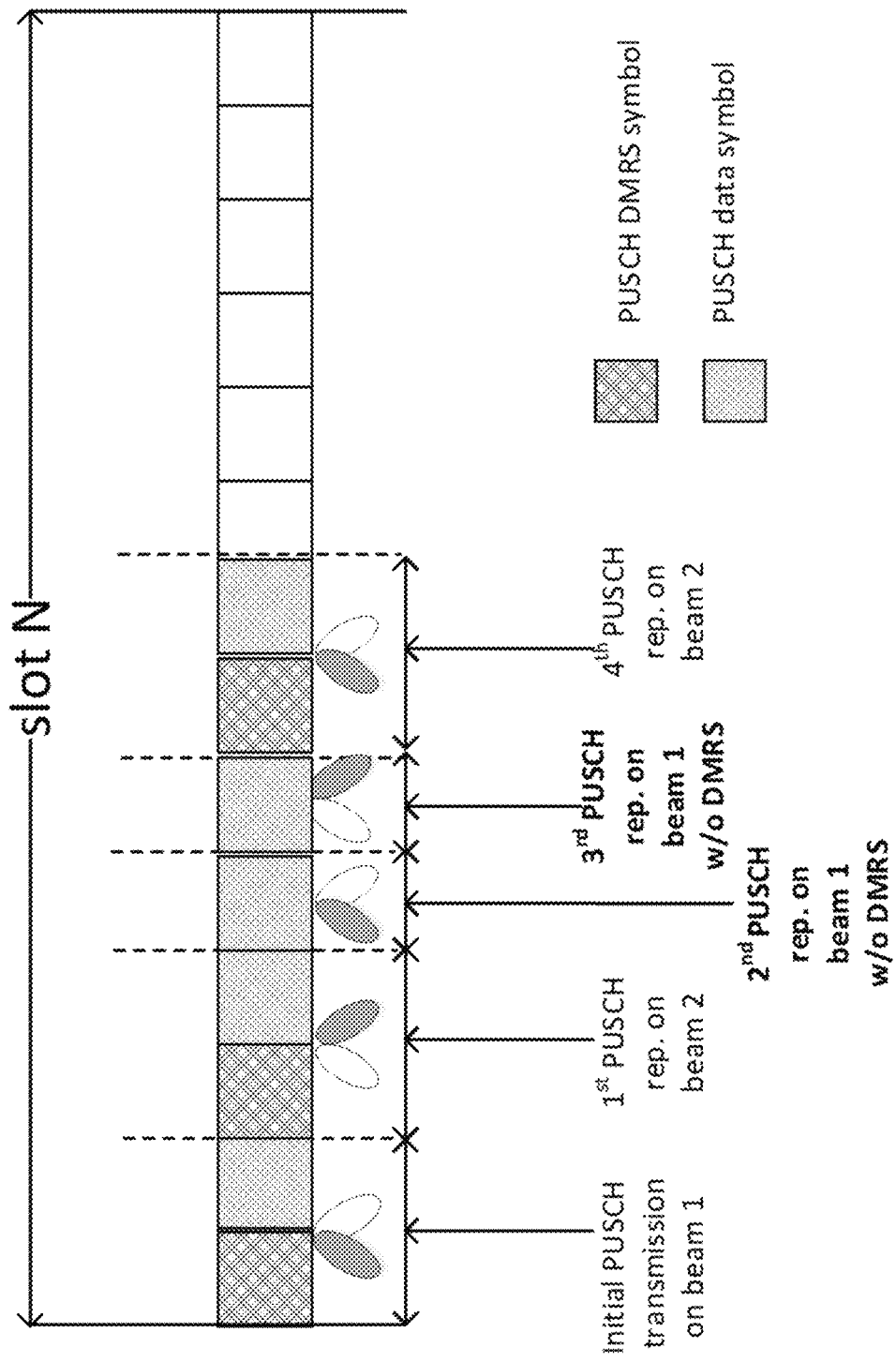
FIG. 20 is a diagram showing an example of repetition with beam hopping.
Figure 21:
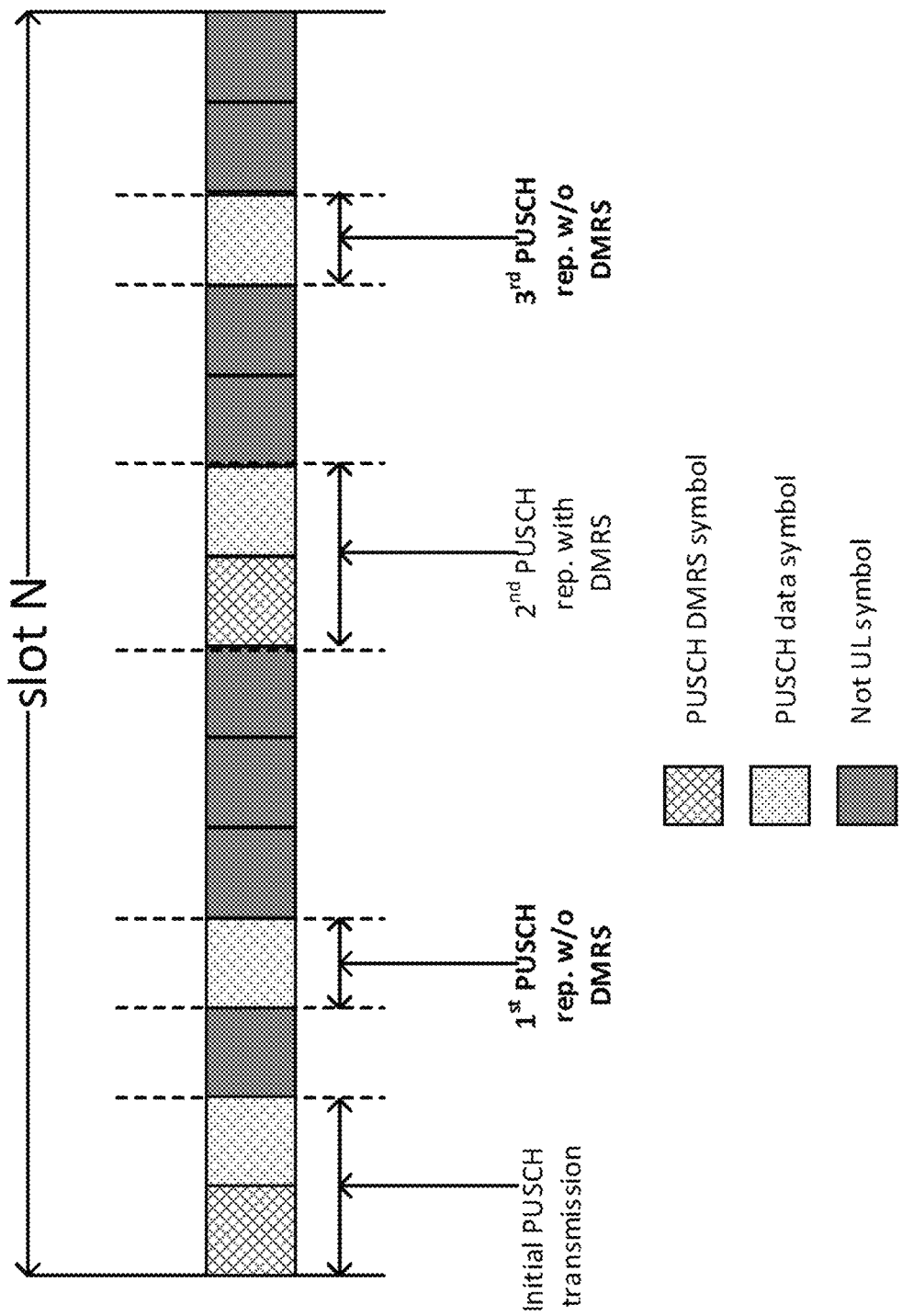
FIG. 21 is a diagram showing an example of repetition with repetition on measurement resources in a configured grant.

However, flexibility in repetition, as discussed in the present disclosure, can even be utilized in scenarios of frequency hopping, beam hopping and small measurement resources, as shown in FIGS. 19 to 21. In order to utilize the DMRS from last available transmission for channel estimation in current repetition round is that the same phase is used. For frequency hopping, the channel estimation from the last available DMRS in the same hop can be done. Similarly for beam hopping, the channel estimation from the last available DMRS in the same beam can be done.

Accordingly, in some embodiments, as shown in FIG. 19, the transceiver, in operation, transmits the data allocated to a respective one of the one or more subsequent TTIs on a different set of subcarriers from the set of subcarriers in which the data has been transmitted in the TTI from among the plurality of TTIs directly preceding the respective TTI. In other words, in two TTIs from among the plurality of TTIs, the data is allocated to and transmitted on respectively different sets of subcarriers. The set of subcarriers may correspond to 12 subcarriers corresponding to resource block size in frequency domain, or may correspond to a bandwidth part mentioned above. Accordingly, frequency hopping can be performed preceding each subsequent TTI to which a DMRS is allocated. However, if frequency hopping is performed from one to the following TTI from among the plurality of TTIs, the data in the TTI after the frequency hopping step/operation is transmitted in a set of subcarriers on which a DMRS has been transmitted in one of the plurality of TTIs previous to the TTI after the hopping step. In FIG. 19, frequency hopping between two respective groups/sets of frequencies is performed. However, according to the present disclosure, hopping may also be performed between Similarly to frequency hopping described above, in some embodiments, as shown in FIG. 20, the transceiver, in operation, transmits the data allocated to a respective one of the one or more subsequent TTIs on a beam from the beam on which the data has been transmitted in the TTI from among the plurality of TTIs directly preceding the respective subsequent TTI. I.e., in two TTIs among the plurality of TTIs, the data is transmitted on respectively different beams. Similar to the case of frequency hopping, in each TTI, data is transmitted on a beam on which the data has previously been transmitted in another one of the plurality of TTIs. In the example of beamhopping shown in FIG. 20, beamhopping between two different beams is performed.

Beam changes or frequency changes from one to the next TTI may be signaled semi-statically. For instance, in addition to the DMRS allocation indicator, the RRC signaling may similarly include a beamhopping pattern indicator or a frequency hopping pattern indicator. Moreover, the DCI or RRC may include a beamhopping activator and/or a frequency hopping indicator. Alternatively, for the case that flexible DMRS allocation is activated, predetermined hopping patterns may be defined in a standard.

In some further embodiments, the plurality of TTIs to which the data is allocated to be transmitted in an initial transmission and repetitions are not contiguous. I.e., there is a symbol between two from among the plurality of TTIs which is not comprised by any of the plurality of TTIs. i.e., other data and or control signaling different from the data which is allocated to each of the plurality of TTIs may be allocated to the symbol between two of the plurality of TTIs. An example is shown in FIG. 21, where, within a slot, there are an initial PUSCH transmission and three data repetitions, and DMRS being allocated to the TTIs corresponding to the initial transmission and the second repetition. However, between each of these TTIs, there are symbols that are not used for the same series of initial transmission and repetitions. Moreover, these in-between symbols are symbols not used for uplink transmissions.

Furthermore, in most examples shown, the initial transmission begins with a DMRS allocated to the first symbol of a slot. However, particularly in accordance with PUSCH mapping type B discussed above, the present disclosure is not limited to the initial TTI comprising the first symbol in the slot in time order. The initial transmission may alternatively begin on a symbol other than the first symbol in a slot.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to one general aspect, the present disclosure provides transmission device for transmitting data to a reception device in a communication system, the transmission device comprising circuitry which, in operation, allocates the data to a plurality of transmission time intervals, TTIs, respectively comprising a lower number of symbols than a slot and the plurality of TTIs including an initial TTI and one or more subsequent TTIs subsequent to the initial TTI, wherein the data allocated to each of the plurality of TTIs is the same, further allocates a demodulation reference signal, DMRS, to the initial TTI, and obtains a DMRS allocation for each of the subsequent TTIs indicating whether or not no DMRS is allocated to the respective TTI to be transmitted in addition to the data; and a transceiver which, in operation, transmits, within the slot, the data and DMRS allocated to the initial TTI and the data allocated to the one or more subsequent TTIs to the reception device, wherein DMRS transmission in the one or more subsequent TTIs is performed in accordance with the DMRS allocation.

This facilitates providing greater flexibility for repetitions, and enabling latency reduction and/or reliability enhancement.

For instance, no DMRS is transmitted in at least one of the one or more subsequent TTIs.

In some embodiments, the DMRS allocation further indicates that if no DMRS is allocated to the respective TTI, a length of the respective TTI is reduced by one symbol corresponding to the DMRS.

This facilitates reducing latency.

In other embodiments, the DMRS allocation further indicates that if no DMRS is allocated to the respective TTI, a symbol for allocation of the DMRS in the respective TTI is replaced by a symbol for allocation of the data.

This facilitates enhancing reliability.

In further embodiments, the DMRS allocation further indicates that if no DMRS is allocated to the respective TTI, either a length of the respective TTI is reduced by one symbol corresponding to the DMRS or a symbol for allocation of the DMRS in the respective TTI is replaced by a symbol for allocation of the data.

This enhances reducing latency and enhancing reliability.

For instance, if a symbol for allocation of the DMRS in the respective TTI is replaced by a symbol for allocation of the data, the data is transmitted in the respective TTI with a code rate lower than a code rate by which the data is transmitted in the initial TTI.

For instance, the transmission device transmits the data to the reception device on an uplink, the transceiver, in operation, further receives, from the reception device, control signaling including a DMRS allocation indicator for each of the subsequent TTIs indicating the respective DMRS allocation, and the circuitry, in operation, obtains the DMRS allocation for each of the subsequent TTIs by evaluating the control signaling.

For example, the DMRS allocation indicator for each subsequent TTI is a two-bit allocation indicator.

In some embodiments, the DMRS allocation indicator is included in higher-layer signaling.

For instance, the control signaling further includes an activation indicator indicating whether or not no DMRS is allocated to any of the one or more subsequent TTIs.

In some exemplary embodiments, the activation indicator is included in higher-layer signaling. This provides for avoiding additional physical layer signaling overhead.

In other exemplary embodiments, the activation indicator is a one-bit indicator included in downlink channel information, DCI.

This enables dynamic switching of flexible DMRS allocation.

In some embodiments, the transmission device transmits the data to the reception device on a downlink, and the transceiver, in operation, further transmits, to the reception device, control signaling including a DMRS allocation indicator for each of the subsequent TTIs indicating the respective DMRS allocation.

For instance, in two TTIs from among the plurality of TTIs, the data is allocated to and transmitted on respectively different sets of subcarriers.

For example, in two TTIs from among the plurality of TTIs, the data is transmitted on respectively different beams.

In some embodiments, a symbol between two from among the plurality of TTIs is not comprised by any of the plurality of TTIs.

According to another general aspect, provided is a reception device for receiving data from a transmission device in a communication system, the reception device comprising circuitry which, in operation, obtains a demodulation reference signal, DMRS, allocation for each of one or more subsequent TTIs subsequent to an initial TTI, the DMRS allocation indicating whether or not no DMRS is allocated to the respective TTI to be received in addition to the data, wherein a plurality of TTIs including the initial TTI and the one or more subsequent TTIs respectively comprise a lower number of symbols than a slot, a DMRS is allocated to the initial TTI, and the data allocated each of the plurality of TTIs is the same and further comprising a transceiver which, in operation, receives, within the slot, the data and DMRS allocated to the initial TTI and the data allocated to the one or more subsequent TTIs from the transmission device, wherein DMRS reception in the one or more subsequent TTIs is performed in accordance with the DMRS allocation.

For instance, no DMRS is transmitted in at least one of the one or more subsequent TTIs.

In some embodiments, the DMRS allocation further indicates that if no DMRS is allocated to the respective TTI, a length of the respective TTI is reduced by one symbol corresponding to the DMRS.

In other embodiments, the DMRS allocation further indicates that if no DMRS is allocated to the respective TTI, a symbol for allocation of the DMRS in the respective TTI is replaced by a symbol for allocation of the data.

In further embodiments, the DMRS allocation further indicates that if no DMRS is allocated to the respective TTI, either a length of the respective TTI is reduced by one symbol corresponding to the DMRS or a symbol for allocation of the DMRS in the respective TTI is replaced by a symbol for allocation of the data.

For instance, if a symbol for allocation of the DMRS in the respective TTI is replaced by a symbol for allocation of the data, the data is transmitted in the respective TTI with a code rate lower than a code rate by which the data is transmitted in the initial TTI.

For instance, the reception device receives the data from the transmission device on an uplink, further transmits, to the transmission device, control signaling including a DMRS allocation indicator for each of the subsequent TTIs indicating the respective DMRS allocation.

For example, the DMRS allocation indicator for each subsequent TTI is a two-bit allocation indicator.

In some embodiments, the DMRS allocation indicator is included in higher-layer signaling.

For instance, the control signaling further includes an activation indicator indicating whether or not no DMRS is allocated to any of the one or more subsequent TTIs.

In some exemplary embodiments, the activation indicator is included in higher-layer signaling.

In other exemplary embodiments, the activation indicator is a one-bit indicator included in downlink channel information, DCI.

In some embodiments, the reception device receives the data from the transmission device on a downlink, the transceiver, in operation, further receives, from the transmission device, control signaling including a DMRS allocation indicator for each of the subsequent TTIs indicating the respective DMRS allocation, and the circuitry, in operation, obtains the DMRS allocation for each of the subsequent TTIs by evaluating the control signaling.

For instance, in two TTIs from among the plurality of TTIs, the data is allocated to and received on respectively different sets of subcarriers.

For example, in two TTIs from among the plurality of TTIs, the data is received on respectively different beams.

In some embodiments, a symbol between two from among the plurality of TTIs is not comprised by any of the plurality of TTIs.

In another general aspect, the disclosure provides a transmission method for a transmission device transmitting data to a reception device in a communication system, the transmission method comprising obtaining a demodulation reference signal, DMRS, allocation for each of one or more subsequent TTIs subsequent to an initial TTI, the DMRS allocation indicating whether or not no DMRS is allocated to the respective TTI to be transmitted in addition to the data, wherein a plurality of TTIs including the initial TTI and the one or more subsequent TTIs respectively comprise a lower number of symbols than a slot; allocating the same data to each of the plurality of TTIs, and allocating a DMRS to the initial TTI; and transmitting, within the slot, the data and DMRS allocated to the initial TTI and the data allocated to the one or more subsequent TTIs to the reception device, wherein DMRS transmission in the one or more subsequent TTIs is performed in accordance with the DMRS allocation.

For instance, no DMRS is transmitted in at least one of the one or more subsequent TTIs.

In some embodiments, the DMRS allocation further indicates that if no DMRS is allocated to the respective TTI, a length of the respective TTI is reduced by one symbol corresponding to the DMRS.

In other embodiments, the DMRS allocation further indicates that if no DMRS is allocated to the respective TTI, a symbol for allocation of the DMRS in the respective TTI is replaced by a symbol for allocation of the data.

In further embodiments, the DMRS allocation further indicates that if no DMRS is allocated to the respective TTI, either a length of the respective TTI is reduced by one symbol corresponding to the DMRS or a symbol for allocation of the DMRS in the respective TTI is replaced by a symbol for allocation of the data.

For instance, if a symbol for allocation of the DMRS in the respective TTI is replaced by a symbol for allocation of the data, the data is transmitted in the respective TTI with a code rate lower than a code rate by which the data is transmitted in the initial TTI.

For instance, the data is transmitted to the reception device on an uplink, the transmission method further comprises receiving, from the reception device, control signaling including a DMRS allocation indicator for each of the subsequent TTIs indicating the respective DMRS allocation, and in the obtaining step, the DMRS allocation is obtained for each of the subsequent TTIs by evaluating the control signaling.

For example, the DMRS allocation indicator for each subsequent TTI is a two-bit allocation indicator.

In some embodiments, the DMRS allocation indicator is included in higher-layer signaling.

For instance, the control signaling further includes an activation indicator indicating whether or not no DMRS is allocated to any of the one or more subsequent TTIs.

In some exemplary embodiments, the activation indicator is included in higher-layer signaling.

In other exemplary embodiments, the activation indicator is a one-bit indicator included in downlink channel information, DCI.

In some embodiments, the data is transmitted to the reception device on a downlink, and the transmission method further comprises transmitting, to the reception device, control signaling including a DMRS allocation indicator for each of the subsequent TTIs indicating the respective DMRS allocation.

For instance, in two TTIs from among the plurality of TTIs, the data is allocated to and transmitted on respectively different sets of subcarriers.

For example, in two TTIs from among the plurality of TTIs, the data is transmitted on respectively different beams.

In some embodiments, a symbol between two from among the plurality of TTIs is not comprised by any of the plurality of TTIs.

According to another general aspect, the disclosure provides a reception method for a reception device receiving data from a transmission device in a communication system, the reception method comprising obtaining a demodulation reference signal, DMRS, allocation for each of one or more subsequent TTIs subsequent to an initial TTI, the DMRS allocation indicating whether or not no DMRS is allocated to the respective TTI to be received in addition to the data, wherein a plurality of TTIs including the initial TTI and the one or more subsequent TTIs respectively comprise a lower number of symbols than a slot, a DMRS is allocated to the initial TTI, and the data allocated each of the plurality of TTIs is the same, and receiving, within the slot, the data and DMRS allocated to the initial TTI and the data allocated to the one or more subsequent TTIs from the transmission device, wherein DMRS reception in the one or more subsequent TTIs is performed in accordance with the DMRS allocation.

For instance, no DMRS is transmitted in at least one of the one or more subsequent TTIs.

In some embodiments, the DMRS allocation further indicates that if no DMRS is allocated to the respective TTI, a length of the respective TTI is reduced by one symbol corresponding to the DMRS.

In other embodiments, the DMRS allocation further indicates that if no DMRS is allocated to the respective TTI, a symbol for allocation of the DMRS in the respective TTI is replaced by a symbol for allocation of the data.

In further embodiments, the DMRS allocation further indicates that if no DMRS is allocated to the respective TTI, either a length of the respective TTI is reduced by one symbol corresponding to the DMRS or a symbol for allocation of the DMRS in the respective TTI is replaced by a symbol for allocation of the data.

For instance, if a symbol for allocation of the DMRS in the respective TTI is replaced by a symbol for allocation of the data, the data is transmitted in the respective TTI with a code rate lower than a code rate by which the data is transmitted in the initial TTI.

For instance, the data is received from the transmission device on an uplink, and the method further comprises transmitting, to the transmission device, control signaling including a DMRS allocation indicator for each of the subsequent TTIs indicating the respective DMRS allocation.

For example, the DMRS allocation indicator for each subsequent TTI is a two-bit allocation indicator.

In some embodiments, the DMRS allocation indicator is included in higher-layer signaling.

For instance, the control signaling further includes an activation indicator indicating whether or not no DMRS is allocated to any of the one or more subsequent TTIs.

In some exemplary embodiments, the activation indicator is included in higher-layer signaling.

In other exemplary embodiments, the activation indicator is a one-bit indicator included in downlink channel information, DCI.

In some embodiments, the data is received from the transmission device on a downlink, the reception method further includes receiving, from the transmission device, control signaling including a DMRS allocation indicator for each of the subsequent TTIs indicating the respective DMRS allocation, and in the obtaining step, the DMRS allocation for each of the subsequent TTIs is obtained by evaluating the control signaling.

For instance, in two TTIs from among the plurality of TTIs, the data is allocated to and received on respectively different sets of subcarriers.

For example, in two TTIs from among the plurality of TTIs, the data is received on respectively different beams.

In some embodiments, a symbol between two from among the plurality of TTIs is not comprised by any of the plurality of TTIs.

Summarizing, the disclosure relates to a transmission device for transmitting data to a reception device in a communication system. The transmission device comprises circuitry which, in operation, allocates the data to a plurality of transmission time intervals, TTIs, respectively comprising a lower number of symbols than a slot and the plurality of TTIs including an initial TTI and one or more subsequent TTIs subsequent to the initial TTI, wherein the data allocated to each of the plurality of TTIs is the same, further allocates a demodulation reference signal, DMRS, to the initial TTI, and obtains a DMRS allocation for each of the subsequent TTIs indicating whether or not no DMRS is allocated to the respective TTI to be transmitted in addition to the data. The transmission device further comprises a transceiver which, in operation, transmits, within the slot, the data and DMRS in accordance with the DMRS allocation.

The invention claimed is:

1. A transmission device comprising:
    circuitry which, in operation, allocates at least one Physical Uplink Shared Channel (PUSCH) repetition in time domain resources comprising a lower number of symbols than a slot, and
    a transceiver which, in operation, receives a demodulation reference signal (DMRS) allocation indicating a position of DMRS symbol(s) for the time domain resources and receives information indicating a position of invalid symbol(s) usable for data or control signalling other than the at least one PUSCH repetition, and transmits the at least one PUSCH repetition in the time domain resources according to the position of the DMRS symbol(s) and according to the position of the invalid symbol(s).

2. The transmission device according to claim 1, wherein the DMRS symbol is not valid in at least one of the time domain resources.

3. The transmission device according to claim 1, wherein the DMRS allocation indicator further indicates that, if the DMRS symbol is not valid in the time domain resource, either a length of the time domain resource is reduced by one symbol corresponding to the DMRS or a symbol for allocation of the DMRS in the time domain resource is replaced by a symbol for allocation of PUSCH data.

4. The transmission device according to claim 3, wherein, if a symbol for allocation of the DMRS in the time domain resource is replaced by a symbol for allocation of the PUSCH data, the PUSCH data is transmitted in the time domain resource with a code rate lower than a code rate by which the PUSCH data is transmitted in an initial time domain resource of the time domain resources.

5. The transmission device according to claim 1, wherein the DMRS allocation indicator for each time domain resource is a two-bit allocation indicator.

6. The transmission device according to claim 1, wherein the DMRS allocation indicator is included in higher-layer signaling.

7. The transmission device according to claim 6, wherein the transceiver, in operation, receives an activation indicator indicating whether the DMRS allocation indicator is used to indicate the positions of the DMRS symbols.

8. The transmission device according to claim 7, wherein the activation indicator is included in higher-layer signaling.

9. The transmission device according to claim 7, wherein the activation indicator is a one-bit indicator included in downlink channel information (DCI).

10. The transmission device according to claim 1, wherein the invalid symbol(s) are not uplink (UL) symbol(s).

11. A transmission method for a transmission device, comprising:
    allocating at least one Physical Uplink Shared Channel (PUSCH) repetition in time domain resources comprising a lower number of symbols than a slot;
    receiving a demodulation reference signal (DMRS) allocation indicator indicating a position of DMRS symbol(s) for the time domain resources and receiving information indicating a position of invalid symbol(s) usable for data or control signalling other than the at least one PUSCH repetition; and
    transmitting the at least one PUSCH repetition in the time domain resources according to the position of the DMRS symbol(s) and according to the position of the invalid symbol(s).

12. An integrated circuit, which comprises circuitry configured to:
    control allocating at least one Physical Uplink Shared Channel (PUSCH) repetition in time domain resources comprising a lower number of symbols than a slot;
    control receiving a demodulation reference signal (DMRS) allocation indicator indicating a position of DMRS symbol(s) for the time domain resources and receiving information indicating a position of invalid symbol(s) usable for data or control signalling other than the at least one PUSCH repetition; and control transmitting the at least one PUSCH repetition in the time domain resources according to the position of the DMRS symbol(s) and according to the position of the invalid symbol(s).

* * * * *